US008508597B2

(12) United States Patent
Bourret et al.

(10) Patent No.: US 8,508,597 B2
(45) Date of Patent: Aug. 13, 2013

(54) METHOD AND SYSTEM FOR VIDEO QUALITY ASSESSMENT

(75) Inventors: Alexandre J Bourret, Ipswich (GB); David S Hands, Colchester (GB); Damien Bayart, Ipswich (GB); Andrew G Davis, Woodbridge (GB)

(73) Assignee: British Telecommunications public limited company, London (GB)

( * ) Notice: Subject to any disclaimer, the term of this patent is extended or adjusted under 35 U.S.C. 154(b) by 1772 days.

(21) Appl. No.: 10/560,448

(22) PCT Filed: Jun. 4, 2004

(86) PCT No.: PCT/GB2004/002384
§ 371 (c)(1),
(2), (4) Date: Dec. 13, 2005

(87) PCT Pub. No.: WO2004/114215
PCT Pub. Date: Dec. 29, 2004

(65) Prior Publication Data
US 2006/0152585 A1  Jul. 13, 2006

(30) Foreign Application Priority Data
Jun. 18, 2003  (GB) .................................. 0314161.1

(51) Int. Cl.
*H04N 17/00*  (2006.01)
*H04N 17/02*  (2006.01)

(52) U.S. Cl.
USPC ............ 348/192; 348/180; 348/189; 348/190

(58) Field of Classification Search
USPC ................ 348/192–193, 180–181, 185, 189, 348/190, 461, 473, 806–807, 745–747, 658; 382/294
See application file for complete search history.

(56) References Cited

U.S. PATENT DOCUMENTS

| 5,126,990 | A |   | 6/1992  | Efron et al. |
| 5,446,492 | A | * | 8/1995  | Wolf et al. ..................... 348/192 |
| 5,596,364 | A |   | 1/1997  | Wolf et al. |
| 5,838,828 | A |   | 11/1998 | Mizuki et al. |
| 6,295,083 | B1 | * | 9/2001 | Kuhn ............................ 348/190 |
| 6,400,400 | B1 | * | 6/2002 | Isnardi et al. ................. 348/180 |
| 6,434,275 | B1 |   | 8/2002 | Fukuda et al. |

(Continued)

FOREIGN PATENT DOCUMENTS

| EP | 0556030 A1 | 8/1993 |
| EP | 0 869 685  | 10/1998 |

(Continued)

OTHER PUBLICATIONS

International Search Report—Dec. 14, 2004.

(Continued)

*Primary Examiner* — Trang U Tran
(74) *Attorney, Agent, or Firm* — Nixon & Vanderhye P.C.

(57) ABSTRACT

A method and system for automated video quality assessment which reduces the adverse effects of sub-field/frame misalignments between the reference and test sequences. More particularly, the invention provides for misalignments down to a sub-field/frame level to be handled by individually matching sub-field/frame elements of a test video field/frame with sub-field/frame elements from a reference video field/frame. The use of a matching element size that is significantly smaller than the video field/frame size enables transient sub-field/frame misalignments to be effectively tracked.

51 Claims, 18 Drawing Sheets

(56) References Cited

U.S. PATENT DOCUMENTS

| | | | |
|---|---|---|---|
| 6,483,538 B2 * | 11/2002 | Hu | 348/180 |
| 6,493,023 B1 | 12/2002 | Watson | |
| 6,496,221 B1 | 12/2002 | Wolf et al. | |
| 6,577,764 B2 * | 6/2003 | Myler et al. | 382/228 |
| 6,678,424 B1 * | 1/2004 | Ferguson | 382/286 |
| 6,795,580 B1 * | 9/2004 | Janko et al. | 382/199 |
| 6,822,675 B2 | 11/2004 | Jung et al. | |
| 7,099,518 B2 | 8/2006 | Li et al. | |
| 7,199,819 B2 | 4/2007 | Sugimoto et al. | |
| 2001/0024515 A1 | 9/2001 | Martins et al. | |
| 2003/0086626 A1 | 5/2003 | Yamada | |
| 2003/0133624 A1 | 7/2003 | Dantwala | |
| 2004/0012675 A1 | 1/2004 | Caviedes | |
| 2004/0175056 A1 | 9/2004 | Lee | |
| 2006/0152585 A1 | 7/2006 | Bourret | |
| 2006/0274618 A1 | 12/2006 | Bourret | |

FOREIGN PATENT DOCUMENTS

| | | |
|---|---|---|
| EP | 0940996 A1 | 9/1999 |
| EP | 0977446 A3 | 10/2001 |
| EP | 1289318 A1 | 3/2003 |
| JP | 10-285616 | 10/1998 |
| JP | 2003-141535 | 5/2003 |
| WO | 00/30366 | 5/2000 |
| WO | WO 00/48407 | 8/2000 |
| WO | 03/010952 | 2/2003 |
| WO | 2004/114215 A2 | 12/2004 |

OTHER PUBLICATIONS

UK Search Report—Nov. 28, 2003.
Wolf et al., "Objective Quality Assessment of Digitally Transmitted Video", Processing, 1991., IEEE Pacific RIM Conference on Victoria, BC, Canada May 9-10, 1991, New York, NY, USA, IEEE, US, May 9, 1991, pp. 477-482.
Tektronix MBD: "Applications Picture Quality Testing", pp. 1-11, Oct. 2003.
Tektronix: "Products—Picture Quality Analysis System,—PQA300:Introduction", pp. 1-5, Oct. 2003.
Tektronix, "Measuring and Interpreting Picture Quality in MPEG Compressed Video Content", "A New Generatin of Measurement Tools".
ITU-R BT500, "Methodology for the Subjective Assessment of the Quality of Television Pictures", (1974-1978-1982-1986-1990-1992-1994-1995-1998-1998-2000-2002).
Hekstra et al, PVQM—A Perceptual Video Quality Measure, Signal Processing:Image Communication 17 (2002), pp. 781-798.
U.S. Appl. No. 10/558,673, Bourret, filed Nov. 30, 2005.
Office Action dated Jan. 5, 2009 in U.S. Appl. No. 10/558,673.
International Search Report dated Aug. 23, 2004.
Wolf, "Features for Automated Quality Assessment of Digitally Transmitted Video", NTIA Report 90-264, U.S. Department of Commerce, 'Online! Jun. 1990, pp. 1-82, XP002293368.
Pinho et al., "Figures of Merit for Quality Assessment of Binary Edge Maps", Proceedingsof the International Conference on Image Processing (ICIP) Lausanne, Sep. 16-19, 1996, New York, IEEE, US, vol. 1, pp. 591-594, XP010202463.
Pinho et al., "On the Partition of Binary Edge Maps as a first Step for Quantitative Quality Evaluation", Proceedings of the International Conference on Image Processing (ICIP) Lausanne, Sep. 16-19, 1996, New York, IEEE, US, vol. 1, pp. 343-346, XP010202401.
Fu-Huei Lin et al., "Quality Measure Based Approaches to MPEG Encoding", Proceedings of the International Conference on Image Processing (ICIP) Lausanne, Sep. 16-19, 1996, New York, IEEE, US, vol. 1, pp. 323-326, XP0100202396.
Applicant Response to the Jan. 5, 2009 Office Action issued in related U.S. Appl. No. 10/558,673.
Office Action dated Jul. 10, 2009 issued in related U.S. Appl. No. 10/558,673.
Applicant Response to the Jul. 10, 2009 Office Action issued in related U.S. Appl. No. 10/558,673.
Office Action dated Oct. 20, 2009 issued in related U.S. Appl. No. 10/558,673.
Applicant Response to the Oct. 20, 2009 Office Action issued in related U.S. Appl. No. 10/558,673.
Office Action (5 pgs.) dated Oct. 25, 2010 issued in corresponding Korean Application No. 7024367/2005 with an at least partial English-language translation thereof (2 pgs.).
Office Action (3 pgs.) dated Nov. 30, 2010 issued in corresponding Japanese Application No. 2006-516375 with an at least partial English-language translation thereof (3 pgs.).

* cited by examiner

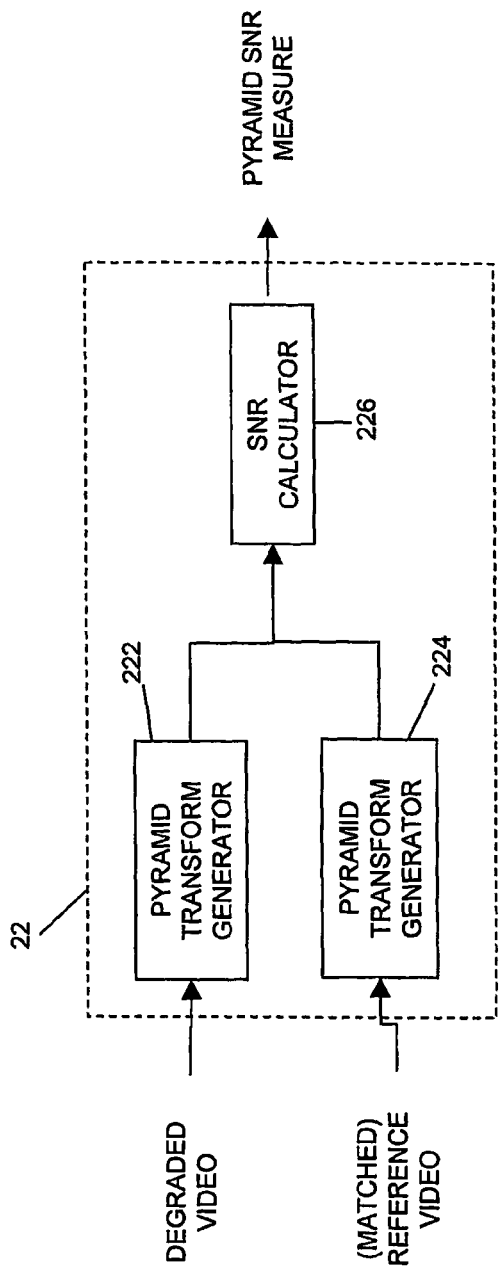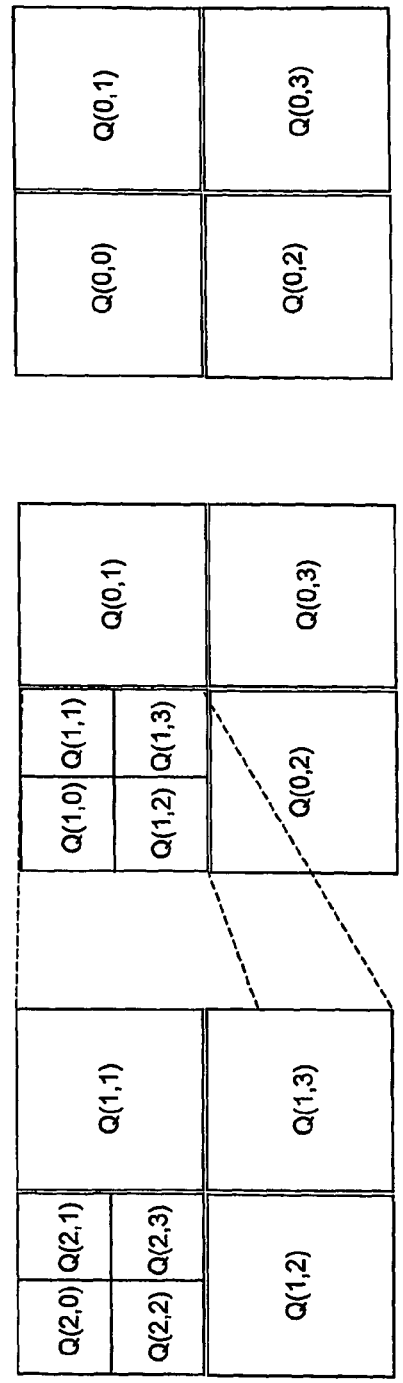
Figure 6
Figure 7

METHOD AND SYSTEM FOR VIDEO QUALITY ASSESSMENT

This application is the U.S. national phase of international application PCT/GB2004/002384 filed 4 Jun. 2004 which designated the U.S. and claims benefit of GB 0314161.1, dated 18 Jun. 2003, the entire content of which is hereby incorporated by reference.

TECHNICAL FIELD

The present invention relates to a method and system for video quality assessment, and in particular to a method and system wherein a video quality assessment value is generated in dependence on sub-field/frame elements.

BACKGROUND TO THE INVENTION AND PRIOR ART

Video quality testing has been performed for many years. Prior to the advent of digital compression techniques for video, formal subjective testing had been used with a relatively stable set of standard methods. In brief, a number of non-expert observers are selected, tested for their visual capabilities, shown a series of tests scenes for about 10 to 30 minutes in a controlled environment, and asked to score the quality of the scenes in one of a variety of manners. Usually, for full reference testing, the reference sequence is shown first, followed by the sequence under test, and the viewer is asked to rate the sequence under test with respect to the reference sequence. Further details of subjective measurements can be found in the relevant standard ITU-R BT.500 "Methodology for the Subjective Assessment of the Quality of Television Picture". This standard was first issued in 1974 and is formally known as CCIR Rec.500, and version 7 of this document covers the past proposed methods for subjective testing.

There are some advantages of subjective testing using human viewers, in that valid results may be produced for both conventional and compressed television systems, and it can work well over a wide range of still and motion picture applications. However, there are clear disadvantages in that the precise set up of the test can affect the result obtained, that meticulous set up and control are required, and that in order to obtain statistically significant results a great many human viewers must be selected and screened. These disadvantages render subjective testing complex and time consuming, with the result that whilst subjective tests may be applicable for development purposes, they do not lend themselves to operational monitoring, production line testing, or the like.

In order to get around the disadvantages of human subjective testing as described above, therefore, it is also known in the art to provide for the automatic assessment of video quality, using automated, and usually computer based, video comparison techniques. A prior art system which performs automatic picture quality analysis is the PQA 300 system from Tektronix Inc of 14200 SW Karl Braun, P.O. Box 500, Beaverton, Oreg. 97077 USA. The PQA 300 works by measuring a two second portion of a five second video test sequence. The video test sequences may be downloaded from CD ROM or recorded from video, and played out to the system under test. The output of the system under test is then stored and analysis thereof performed with DSP accelerated hardware on the two second sequence. The measurement results in a single numeric value of picture quality called the "picture quality rating". The PQA 300 employs a human vision system model known as JND Metrix and performs three different types of analysis of the video information, being spatial analysis, temporal analysis, and full colour analysis, in order to generate the picture quality rating. Additionally, the PQA 300 provides PSNR values which are displayed in the form of an animated map whose intensity is related to the PSNR differences between the reference and the test images. In summary therefore, the PQA 300 is able to analyse test and reference video sequences in order to generate a video quality value, as well as PSNR measurements.

Problems can arise, however, with straightforward comparisons of test and reference sequences to generate the quality metrics mentioned above. For example, spatial or temporal misalignment between the whole or parts of the reference and the test sequence can greatly affect such measurements, but may be perceptually insignificant to a human viewer. Such misalignments must be handled if difference measures are to contribute to reliable and practical full reference assessments.

Constant spatial and temporal misalignments are commonly encountered in full reference test situations, and can be countered by "one off" alignment applied to the whole reference or degraded sequence. Examples of prior art documents which deal with such one off alignments are U.S. Pat. Nos. 6,483,538, 6,259,477, 5,894,324, 6,295,083, and 6,271,879. Additionally, field-based spatial or temporal jitter, where misalignments might vary between fields, can be handled by similar techniques applied on a field by field basis. However, more complex, but equally imperceptible, misalignments may also occur within a field or frame, where different regions of a video field or frame might be subject to different shifts, scaling, or delay. For example, spatial warping, missing lines, or frozen blocks can occur through video processing and need to be taken into account of if a picture quality assessment metric is to be produced automatically which can be used in place of human subjective testing results.

SUMMARY OF THE INVENTION

The present invention addresses the above identified problem by providing a method and system for automated video quality assessment which reduces the adverse effects of sub-field/frame misalignments between the reference and test sequences. More particularly, the invention provides for misalignments down to a sub-field/frame level to be handled by individually matching sub-field/frame elements of a test video field/frame with sub-field/frame elements from a reference video field/frame. The use of a matching element size that is significantly smaller than the video field/frame size enables transient sub-field/frame misalignments to be effectively tracked.

In view of the above, from a first aspect the present invention provides a video quality assessment method, comprising the steps of:

matching sub-field/frame elements of a test video field/frame with corresponding sub-field/frame elements of at least one reference video field/frame; and generating a video quality value in dependence on the matched sub-field/frame elements of the test and reference video fields/frames.

The first aspect of the invention provides the advantages described above of allowing sub-field/frame misalignments and other artefacts to be accounted for, such that the overall video quality value is not affected by such misalignments. In this respect, the sub-field/frame elements are preferably sized so as to permit misalignments and other artefacts which are substantially perceptually unnoticeable to a human viewer to be matched.

In a preferred embodiment, the matching step preferably further comprises, for a sub-field/frame element of the test video field/frame, searching for a matching sub-field/frame element within M1 preceding and/or M2 succeeding reference video fields/frames to a temporally corresponding reference video field/frame to the test video field/frame, wherein M1 and M2 are integers. This allows for matches to be made between sub-elements not only within the temporally corresponding field/frame, but also or alternatively in temporally different fields/frames, thus allowing for temporal artefacts such as block freezing to be taken into account. Preferably the temporal search limits M1 and M2 are predefined, although in variations of the invention they may be adaptively defined.

Within the preferred embodiment the searching step preferably further comprises searching within a spatially bounded region of the reference video fields/frames about the corresponding position within the reference fields/frames as the test sub-field/frame element takes within the test video field/frame. By bounding the spatial extent of the search within each field/frame then processing requirements are reduced, and additionally sub-elements containing only artefacts which are substantially perceptually insignificant to a human viewer will be matched. Preferably the spatial extent of the search region is predefined, although in variations of the invention it may be adaptively defined.

In embodiments of the invention the matching step may preferably further comprise calculating one or more matching statistic values and/or matching vectors; and wherein the generating step generates the video quality parameter in further dependence on the calculated matching statistic values and/or matching vectors. The use of matching statistics from the matching step has been found to substantially improve the overall video quality value which is obtained, making it more similar to video quality values obtained from human subjective testing. The use of matching vectors has similarly been found to improve the overall video quality value.

In embodiments of the invention the generating step preferably further comprises:

calculating a plurality of video characteristic values respectively relating to characteristics of the test and/or reference video fields/frames in dependence on the matched sub-field/frame elements of the test and reference video fields/frames; and integrating at least the calculated video characteristic values together to give the video quality value.

By calculating video characteristic values in dependence on the matched sub-elements and integrating such values together a video quality value which takes account of perceptually insignificant video artefacts may be obtained. Preferably the integrating step further includes integrating the matching statistic value(s) with the calculated video characteristic values to give the video quality value. Moreover, preferably the video characteristic values are respectively any two or more of the following values: one or more spatial frequency values; one or more texture values; at least one edge value; at least one luminance signal to noise ratio value; and/or one or more chrominance signal to noise ratio values.

In a preferred embodiment of the invention, the calculation of the edge value preferably comprises, for a test field/frame:

counting a number of edges in each sub-field/frame element of the test field/frame;

counting a number of edges in each sub-field/frame element of the at least one reference field/frame matched to the sub-field/frame elements of the test field/frame; and determining an edge value for the test field/frame in dependence on the respective counts.

By counting the number of edges within sub-elements of the fields/frames then imperceptible differences in edge position can be accounted for, resulting in an edge evaluation value which can be used to derive an improved video quality value which more closely resembles such a value as derived by human subjective testing.

Preferably, within the preferred embodiment the integrating step further comprises weighting each value by a predetermined weighting factor; and summing the weighted values to give the video quality value. The weighting factors are found by calibration in advance, and can be used to tune the overall integration of the various video characteristic values such that the final video quality value more closely resembles a value obtained from a human subjective test. Preferably the weighting factors and the offset value are dependent on the type of the test and reference video fields/frames, such that for each type of video field/frame weighting values specific to that type may be used. This allows the same advantages provided by the invention to be obtained with many different types of video.

From a second aspect the present invention further provides a system for video quality assessment, comprising:

matching means for matching sub-field/frame elements of a test video field/frame with corresponding sub-field/frame elements of at least one reference video field/frame; and video processing means arranged in use to generate a video quality value in dependence on the matched sub-field/frame elements of the test and reference video fields/frames.

The system of the second aspect of present invention provides substantially the same advantages as previously described in respect of the first aspect of the invention. Moreover, substantially similar further features and advantages may also be provided in respect of the second aspect as were described above in respect of the first aspect.

From a third aspect, the present invention further provides a computer program or suite of programs so arranged such that when executed by a computer system it/they cause/s the system to perform the process of any of the preceding claims. The computer program or programs may be embodied by a modulated carrier signal incorporating data corresponding to the computer program or at least one of the suite of programs, for example a signal being carried over a network such as the Internet.

Additionally, from a yet further aspect the invention also provides a computer readable storage medium storing a computer program or at least one of suite of computer programs according to the third aspect. The computer readable storage medium may be any magnetic, optical, magneto-optical, solid-state, or other storage medium capable of being read by a computer.

BRIEF DESCRIPTION OF THE DRAWINGS

Further features and advantages of the present invention will become apparent from the following description of embodiments thereof, presented by way of example only, and by reference to the accompanying drawings, wherein like reference numerals refer to like parts, and wherein:—

FIG. 6 is a block diagram of the spatial frequency analyser used in the embodiment of the present invention;

FIG. 7 is a diagram illustrating the construction of a pyramid array in the embodiment of the invention;

DESCRIPTION OF THE PREFERRED EMBODIMENTS

Embodiments of the present invention will now be described.

Figure 1:
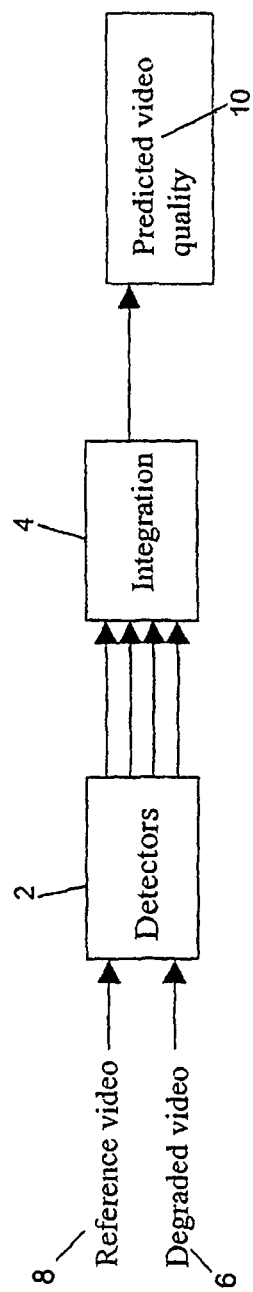
FIG. 1 is an overall block diagram of the system of the present invention.

FIG. 1 illustrates an overall system block diagram of the general arrangement of the embodiments of the invention. Within FIG. 1 a reference sequence comprising reference sequence fields/frames 8 is input to a detector module 2. Similarly, a test sequence of video fields/frames 6 (interchangeably referred to herein as either the test sequence, or the degraded sequence) is also input in to the detector module 2. The test sequence is obtained by inputting the reference sequence to a system to be tested (such as a video recording device, a broadcast system, or a video codec, for example), and then taking the output of the system under test as the test sequence. The detector module 2 acts to detect various video characteristics of the input reference and test video fields/frames and generates video characteristic values which are then output to an integration module 4. The integration module 4 integrates the video characteristics values together to give a predicted video quality value 10, which is output therefrom.

Figure 2:
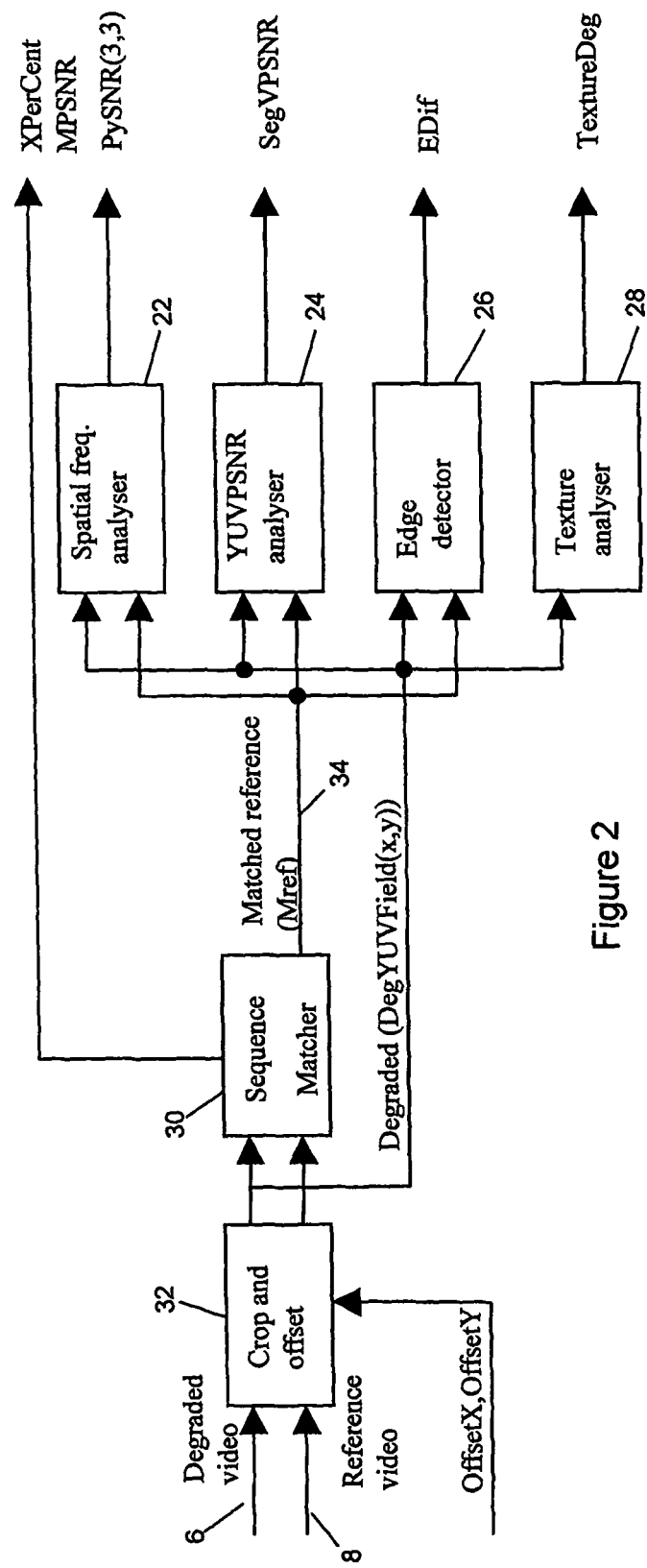
FIG. 2 is a system block diagram showing the individual parts of the embodiment of the present invention.

FIG. 2 illustrates in more detail the arrangement of the embodiments of the invention. Here, it will be seen that the system of the invention provides a crop and offset module 32, which is arranged to receive as input the degraded video sequence 6 and the reference video sequence 8. Additionally, the crop and offset module 32 receives two predetermined offset values, offsetX and offsetY as input. The crop and offset module 32 acts to convert the input sequences to a de-interlaced format if required, and also to crop the input sequences either with or without offset as required in a manner to be described later. The converted and cropped respective test and reference video sequences are then output from the crop and offset module 32 to a sequence matcher module 30. Additionally, as shown in FIG. 2, the cropped degraded video sequence 6 is also output from the crop and offset module 32 directly to the degraded sequence inputs of a spatial frequency analyser 22, a luminance and chrominance peak signal to noise ratio analyser 24, an edge detector analyser 26, and a texture analyser 28. The purposes and operations of the analysers 22 to 28 will be described later.

Returning to the sequence matcher module 30, the sequence matcher module 30 receives the cropped degraded video sequence 6 and reference video sequence 8 and acts to match sub-elements of the degraded video fields/frames with matching sub-elements of the reference fields/frames, in order to generate for each test video field/frame a matched reference field/frame comprising the sub-elements of the reference video fields/frames which match to the sub-elements of the test video field/frame under test. The matched reference video field/frame 34 is then output from the sequence matcher module 30 to a reference input of each of the spatial frequency analyser 22, the luminance and chrominance peak signal to noise ratio analyser 24, and the edge detector analyser 26. Additionally, in generating the matched reference fields/frames 34, the sequence matcher module 30 produces matching statistics which can be used to produce matching statistical values (XPerCent, YPerCent and TPerCent) which are also output therefrom. The matcher module 30 also produces a matched peak signal to noise ration value (MPSNR) which is also output therefrom.

Returning now to a brief consideration of each of the four analyser modules 22 to 28, the spatial frequency analyser 22 acts to analyse the input test video fields/frame and matched reference video fields/frames and generates pyramid SNR values PySNR (a, b) from a pyramid analysis of the input matched reference fields/frame and the test field/frame. Additionally, the luminance and chrominance PSNR analyser 24 compares the input matched reference field/frame and the input test field/frame to generate luminance and chrominance PSNR values which are then output. Similarly, the edge detector analyser 26 analyses the input matched reference field/frame and the input test field/frame and outputs a single edge detector value EDif. Finally, the texture analyser 26 analyses the test field/frame to calculate a parameter TextureDeg indicative of the texture within the frame. Please note that although not shown on FIG. 2 the texture analyser 28 can also receive any of the original reference fields/frames 8, or the matched reference fields/frames 34, and generate a parameter TextureRef or TextureMref respectively relating to these. In any event, the operations of each of these spatial frequency analyser 22, the luminance and chrominance peak signal to noise ratio analyser 24, the edge detector analyser 26, and the texture analyser 28 will be described in more detail later.

Referring back to FIG. 1, it will be seen that the output from the respective analysers 22 to 28, as well as the percent and MPSNR values output from the sequence matcher module 30, are each input to the integration module 4, which acts to integrate the values together to produce the predicted video quality value 10. The operation of the integrator 4 will also be described in detail later.

Referring back to FIG. 2, the operations of each of the individual modules and analysers shown therein will now be described with reference to FIGS. 3 to 13.

Figure 3:
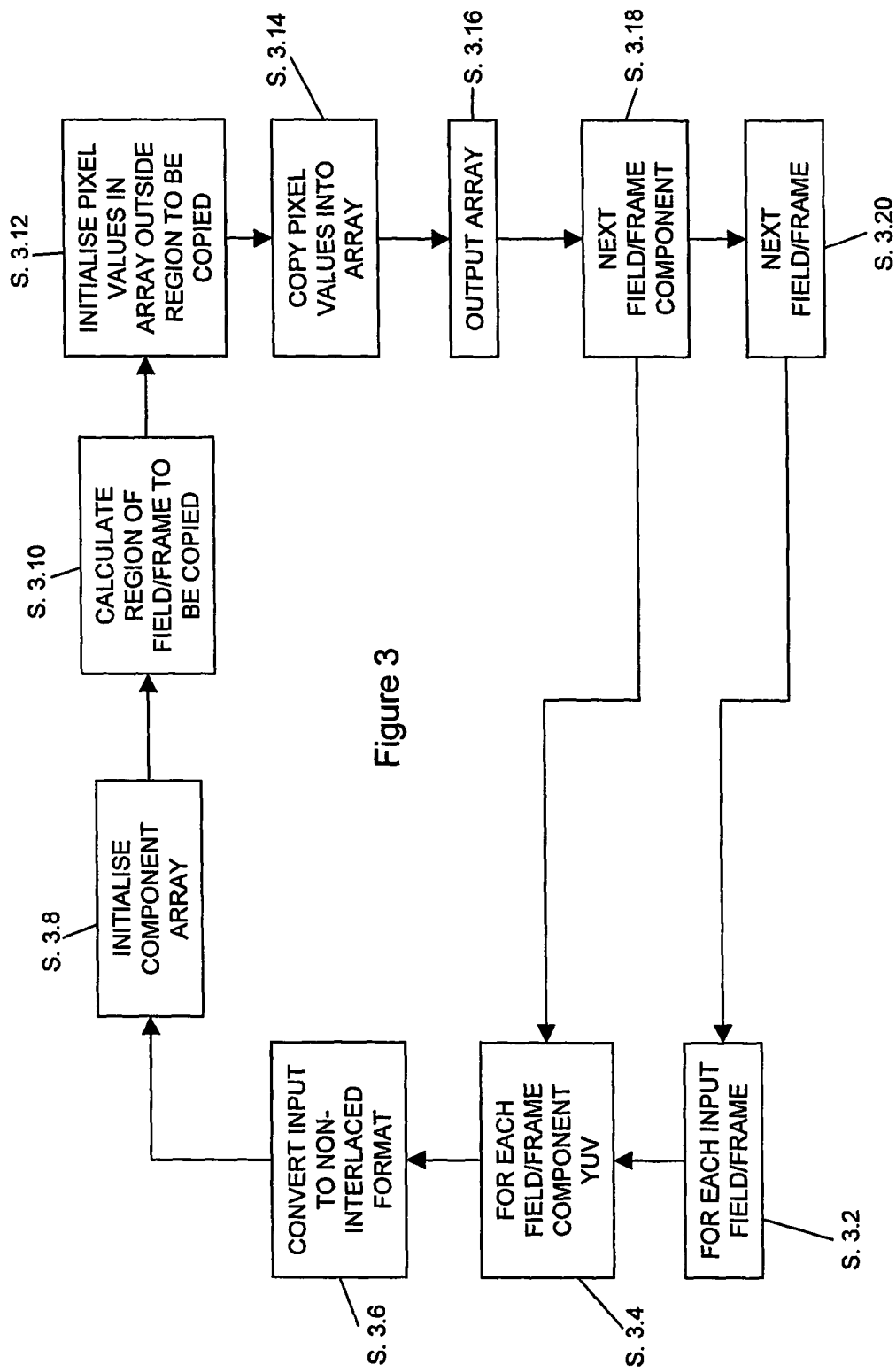
FIG. 3 is a flow diagram illustrating the steps performed to crop and offset the input video signals in the embodiment of the present invention.

Dealing first with the crop and offset module 32, FIG. 3 is a flow diagram illustrating the steps performed by the crop and offset module 32 on the input test video fields/frames and reference video fields/frames.

The general procedure performed by the crop and offset module 32 is to first convert input sequences from interlaced format to a block deinterlaced format, and then to crop with offset the degraded input sequence and crop without offset the reference input sequence. FIG. 3 illustrates an example routine which accomplishes these tasks.

The routine of FIG. 3 is applied to each input sequence (test and reference) separately, to produce respective cropped test and reference sequences. The operation of the routine is as follows.

Firstly, at step 3.2 a FOR processing loop is started, which causes the crop and offset module to process every field/frame in an input sequence (one of the test or reference sequences). Then, at step 3.4 a further, nested, FOR processing loop is commenced, which causes the crop and offset module to perform the process for each of the component parts (Y, U, and V, for example) of each field/frame.

Within the nested FOR loops, the first action to be performed is that of step 3.6, wherein the present component part of the input field/frame is first converted, if necessary, to a non-interlaced format. For example, conversion may be performed from YUV422 interlaced format to a block YUV444 deinterlaced format so that each successive field is represented by arrays RefY, RefU, and RefV, in accordance with the following:

$$\text{Re}fY(x,y) \; x=0\ldots X-1, y=0\ldots Y-1 \tag{3-1}$$

$$\text{Re}fU(x,y) \; x=0\ldots X-1, y=0\ldots Y-1 \tag{3-2}$$

$$\text{Re}fV(x,y) \; x=0\ldots X-1, y=0\ldots Y-1 \tag{3-3}$$

where X is the number of horizontal pixels within a field and Y the number of vertical pixels. For a YUV422 input, each U and V value must be repeated to give the full resolution arrays InUField and InVField.

Next, at step 3.8 an array to hold the cropped and offset pixel values for the present component (Y, U, or V) is initialised. The array will be one of RefYfield, RefUfield, RefVfield, DegYfield, DegUfield, or DegVfield, depending upon which of the reference or test sequences is presently being processed, and which of the component parts of the present frame of the sequence is being processed. A full set of Yfield, Ufield, and Vfield arrays are generated for each input field.

Following step 3.8, at step 3.10 the region of each field/frame component to be copied is calculated, taking into account any offsets to be applied, if any. This routine crops with offset the degraded input sequence and crops without offset the reference input sequence. The offset parameter OffsetX and OffsetY are determined externally and define the number of pixels horizontal and vertical that the degraded sequence is offset from the reference. The picture origin is defined as being in the top left hand corner of the image, with a +ve horizontal increment moving right and a +ve vertical increment moving down the picture. A value of XOffset=2 indicates that the degraded fields are offset to the right by 2 pixels and a value of YOffset=2 indicates an offset down of 2 pixels. The offset values to be applied can be found by an image alignment technique or the like. Image alignment techniques are known in the art, and are described in some of the prior art documents referenced in the introduction.

For an input field with YUV values stored in YUV444 format in arrays InYField, InUField, and InVField the cropped and offset output is calculated according to (3-4) to (3-20).

$$X\text{Start}=-\text{Offset}X \tag{3-4}$$

$$\text{if}(X\text{Start}<C_x)\text{then } X\text{Start}=C_x \tag{3-5}$$

$$X\text{End}=X-1-\text{Offset}X \tag{3-6}$$

$$\text{if}(X\text{End}>X-C_x-1)\text{then } X\text{End}=X-C_x-1 \tag{3-7}$$

$$Y\text{Start}=-\text{Offset}Y \tag{3-8}$$

$$\text{if}(Y\text{Start}<C_y)\text{then } Y\text{Start}=C_y \tag{3-9}$$

$$Y\text{End}=Y-1-\text{Offset}Y \tag{3-10}$$

$$\text{if}(Y\text{End}>Y-C_y-1)\text{then } Y\text{End}=Y-C_y-1 \tag{3-11}$$

X and Y give the horizontal and vertical field dimensions respectively and $C_x$ and $C_y$ the number of pixels to be cropped from left and right and top and bottom.

For 625 line video sequences, the following values may be used:

$$X=720, Y=288, C_x=30, C_y=10 \tag{3-12}$$

Whereas for for 525 line sequences, the values below may be used:—

$$X=720, Y=243, C_x=30, C_y=10 \tag{3-13}$$

Xstart, Xend, Ystart and Yend now define the region of each field that will be copied. Pixels outside this region are initialised according to (3-14) to (3-17) at step 3.12, where YField, UField and VField are X×Y output pixel arrays containing Y, U and V values respectively.

At step 3.12 the vertical bars to the left and right of the field are initialised according to:

$$Y\text{Field}(x,y)=0 \; x=0\ldots X\text{Start}-1, X\text{End}+1\ldots X-1 \; y=0\ldots Y-1 \tag{3-14}$$

$$U\text{Field}(x,y)=V\text{Field}(x,y)=128 \; x=0\ldots X\text{Start}-1, X\text{End}+1\ldots X-1 \; y=0\ldots Y-1 \tag{3-15}$$

The horizontal bars at the top and bottom of the field are initialised according to:

$$Y\text{Field}(x,y)=0 \; x=X\text{Start}\ldots X\text{End}, y=0\ldots Y\text{Start}-1, Y\text{End}+1\ldots Y-1 \tag{3-16}$$

$$U\text{Field}(x,y)=V\text{Field}(x,y)=128 \; x=X\text{Start}\ldots X\text{End} \; y=0\ldots Y\text{Start}-1, Y\text{End}+1\ldots Y-1 \tag{3-17}$$

Finally, at step 3.14 the pixel values are copied according to:

$$Y\text{Field}(x,y)=\text{In}Y\text{Field}(x+\text{Offset}X,y+\text{Offset}Y) \; x=X\text{Start}\ldots X\text{End} \; y=Y\text{Start}\ldots Y\text{End} \tag{3-18}$$

$$U\text{Field}(x,y)=\text{In}U\text{Field}(x+\text{Offset}X,y+\text{Offset}Y) \; x=X\text{Start}\ldots X\text{End} \; y=Y\text{Start}\ldots Y\text{End} \tag{3-19}$$

$$V\text{Field}(x,y)=\text{In}V\text{Field}(x+X\text{Offset},y+Y\text{Offset}) \; x=X\text{Start}\ldots X\text{End} \; y=Y\text{Start}\ldots Y\text{End} \tag{3-20}$$

For the degraded input, cropping and shifting produces output field arrays DegYField, DegUField and DegVField, whilst cropping without shifting for the reference sequence produces RefYField, RefUField and RefVfield. These X×Y two dimensional arrays are then used as inputs to the matching module 30 and analysers 22 to 28 as described below.

The cropped test video fields/frames and reference video fields/frames are output from the crop and offset module 32 to the sequence matching module 30. In order to perform the matching process, the sequence matcher module 30 must receive several fields/frames of each of the reference and test sequences 30, and buffer these fields/frames. Preferably, as many reference and test fields/frames sequences are buffered as the matching module 30 has buffer space. The operation of the sequence matching module 30 is shown in detail in FIG. 5.

Firstly, at step 5.2 the matching module 30 receives the cropped reference and test fields/frames sequences and buffers the individual fields/frames, as mentioned above. Then, at step 5.4 a processing loop is started for each of the test video fields/frames N such that over time each of the input test fields/frames is processed. Within the processing loop, the next step for the present field/frame N is performed at step 5.6 wherein the present field/frame is split into bx by pixel blocks, where both bx and by are preferably 9. Each pixel block is indexed by the field/frame N in which it belongs, and the top left co-ordinate (x, y) of that block. Then, the next step, at step 5.8, is to start a second processing loop to process each pixel block $B_{deg}$(N, Px, Py), where N is the frame in which the block is found, and (Px, Py) is the coordinate of the top left pixel in the block.

Figure 4:
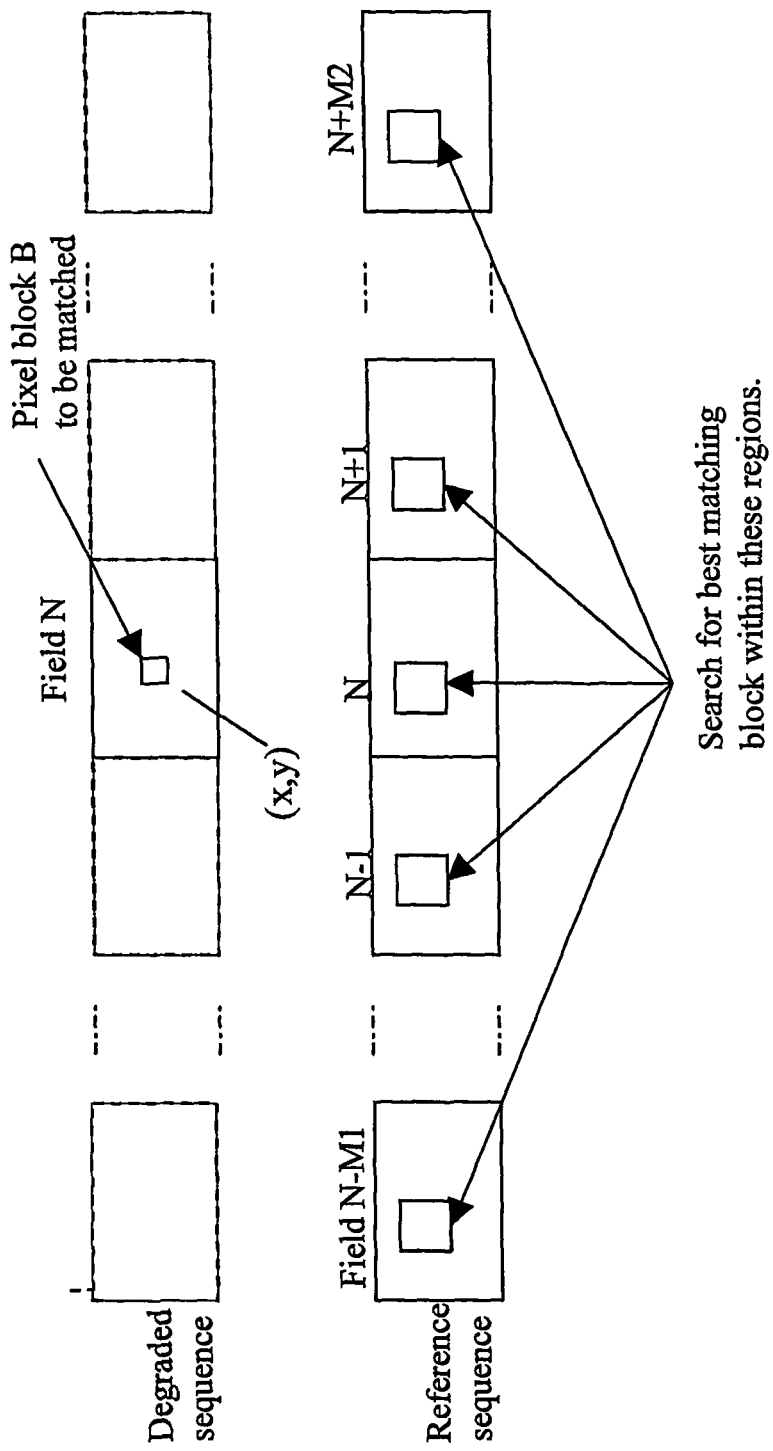
FIG. 4 is a diagram illustrating the effects of the matching of sub elements in the embodiment of the present invention.

Having commenced the processing of each pixel block within the present field/frame, at step 5.10 a further processing loop is commenced wherein each field/frame n from N−M1 to N+M2 within the reference sequence is to be processed. This causes M1 fields/frames prior to the present frame N under test to be searched, as well as M2 succeeding fields/frames. Next, at step 5.12 a further processing loop is commenced to search each horizontal pixel position x between the search boundaries Px−Lx to Px+Lx, and then further at step 5.14 yet another processing loop is commenced to process each vertical position y between the boundaries Py−Ly to Py+Ly. The effect of each of the processing loops commenced at step 5.10, step 5.12, and step 5.14 is to cause an area bounded by the search regions defined by the horizontal and vertical limit Lx and Ly to be searched in each frame from M1 preceding frames to M2 succeeding frames to the reference field/frame which temporally corresponds to the present field/frame under test. This is shown in FIG. 4, wherein the pixel block B shown in field N of the degraded sequence with bottom left pixel coordinate (x, y) is searched for in each of the areas indicated within the reference sequence.

The test performed to search for the pixel block B within the indicated areas of the reference sequence is that a matching error E(n,x,y) is determined for each position within the searched areas at step 5.16, in accordance with the following:—

$$E(n, x, y) = \sum_{j=0}^{bx-1} \sum_{k=0}^{by-1} (deg(N, Px+j, Py+k) - ref(n, x+j, y+k))^2 \quad (5\text{-}1)$$

$$n = N - M1, \ldots, N + M2$$
$$x = Px - Lx, \ldots, Px, \ldots, Px + Lx$$
$$y = Py - Ly, \ldots, Py, \ldots, Py + Ly$$

The matching error that is determined at step 5.16 is stored for the present values of n, x, and y for later use. Next, at step 5.18 the value y is incremented unless it has reached its maximum, and processing returns to step 5.14, wherein the matching error is determined for the next value of y. If y has reached its maximum value, then processing proceeds to step 5.20, wherein x is incremented unless it has reached its maximum value, and processing proceeds back to step 5.12. If x has reached its maximum value then processing proceeds to step 5.22, wherein the counter n is incremented unless it has reached its maximum value as defined in step 5.10, and processing proceeds back to step 5.10 if appropriate. If n has reached its maximum value, then processing proceeds to step 5.24. The effect of the nested FOR loops of step 5.10, 5.12 and 5.14 is that a matching error E(n, x, y) is determined for each possible position within the search regions shown in FIG. 4.

Having obtained the matching error values E(n, x, y) for each possible position, the next step at step 5.24 is to find those values of n, x, and y wherein the error value is a minimum. This is performed by sorting the stored matching error values to determine the minimum error values, and then determining the values of n, x, and y which led to that minimum value i.e.

$$E(n_m, x_m, y_m) = \text{MIN}(E(n,x,y)) \; n = N-M1, \ldots, N+M2$$

$$x = Px - Lx, \ldots, Px, \ldots, Px + Lx$$

$$y = Py - Ly, \ldots, Py, \ldots, Py + Ly \quad (5\text{-}2)$$

Once the minimum matching error has been determined in this way, the matched block to the present block $B_{deg}$(N, Px, Py) being processed is $B_{ref}$(m, xm, ym), which is then the matching block within the reference sequence to the present block being processed within the test sequence.

Having found the present matching block, at step 5.26 the matched block $B_{ref}$(m, xm, ym) is copied into a matched reference array corresponding to the present test field/frame, and in particular is copied into the block within the matched references array which has the identical position to block $B_{deg}$(N, Px, Py). That is, the matched block from the reference array, irrespective of from where in the search region it was taken, is copied into the corresponding block position within the matched reference field/frame being constructed as the present block under test has within the present test field/frame in accordance with the following:—

$$Mref(N, Px+j, Py+k) = ref(n_m, x_m+j, y_m+k) \; j=0 \ldots b_x-1,$$
$$k=0 \ldots b_y-1 \quad (5\text{-}3)$$

where b is the dimensions of the block (bx and by).

Next, at step 5.28 processing is caused to move on to the next pixel block in the present test field/frame, if appropriate, wherein the next pixel block is processed as described above. The processing of every pixel block within the present test field/frame as described above results in a matching reference block being found for each of the test blocks, and the copying of the matching reference block into the matched reference array causes a matched reference field/frame to be produced for the present test field/frame. Thus, once every pixel block has been processed accordingly (as determined by step 5.28), at step 5.30 the newly constructed matched reference field/frame can be output to the respective analysers 22 to 28 as appropriate for use thereby. Moreover, by repeating this process for every field/frame in the test sequence, a sequence of matched fields/frames can be constructed for use by the analysers.

The matching process of first searching for the best match for a degraded block followed by the copying of the resulting block into the matched reference array is repeated for the whole of the desired analysis region. This analysis region is defined by block centre points Px( ) and Py( ) according to:

$$Px(h) = KX1 + KX2 * h \; h = 0 \ldots Qx-1 \quad (5\text{-}4)$$

and $$Py(v) = KY1 + KY2*v \quad v=0 \ldots Qy-1 \tag{5-5}$$

where Qx and Qy define the number of horizontal and vertical analysis blocks, KX1 and KY1 define the initial offsets of the analysis blocks from the top and left respectively and KX2 and KY2 define the analysis block shifts.

The matching analysis of the N'th field therefore produces a matched reference sequence described by $$BlockMRef(N,Px(h),Py(v)) \; h=0 \ldots Qx-1, v=0 \ldots Qy-1 \tag{5-6}$$

and a set of best match error values $$E(N,Px(h),Py(v)) \; h=0 \ldots Qx-1, v=0 \ldots Qy-1 \tag{5-7}$$

A set of offset arrays MatT, MatX and MatY can be defined such that:

$$BlocksRef(N,Px(h),Py(v))=BlockRef(MatT(h,v), MatX(h,v),MatY(h,v)) \; h=0 \ldots Qx-1, v=0 \ldots Qy-1 \tag{5-8}$$

The matching parameters for 625 and 525 broadcast sequences are given in

TABLE 1

| Parameter | 625 | 525 |
|---|---|---|
| Qx | 87 | 87 |
| Qy | 33 | 28 |
| KX1, KY1 | 12 | 12 |
| KX2, KY2 | 8 | 8 |
| Lx, Ly | 4 | 4 |
| bx ,by | 9 | 9 |
| M1 | 4 | 4 |
| M2 | 5 | 5 |
| M | 2871 | 2436 |

Table 1 Search parameters for matching procedure.

The analysis region defined by (5-4) and (5-5) does not cover the complete field size. MRef must therefore be initialised according to (5-9) so that it may be used elsewhere unrestricted.

$$M\,Ref(x,y)=0 \; x=0 \ldots X-1, y=0 \ldots Y-1 \tag{5-9}$$

Returning to the flow diagram, however, having output the newly constructed individual field/frame to the analysers at step 5.30, the matching module next proceeds to calculate a number of matching statistic values and other values from the matching process which has just been performed, and the calculation of these matching statistic values and the other values is described next.

The primary function of the matching module 30 is to produce a matched reference sequence for use within the detection module of the video quality assessment system, and the generation of this matched reference sequence is describe above. However, it has also been found that some measures derived within the matching process can also be of use in producing the final video quality value. One such measure, that is related to the horizontall matching statistics, is described below.

At step 5.32, horizontal matching statistics from the matching process are calculated for use in the integration process. The best match for each analysis block, determined as described previously is used in the construction of a histogram histX for each field according to:

$$histX(MatX(h,v)-Px(h)+Lx)=histX(MatX(h,v)-Px(h)+Lx)+1 \; h=0 \ldots Qx-1, v=0 \ldots Qy-1 \tag{5-10}$$

where array histX is initialised to zero for each field. The histogram is then used to determine the measure fXPerCent according to:

$$fXPerCent = 100 * \text{Max}(histX(i)) \Big/ \sum_{j=0}^{2Lx} histX(j) \tag{5-11}$$

$$i = 0 \ldots 2Lx$$

For each field, the fXPerCent measure gives the proportion (%) of matched blocks that contribute to the peak of the matching histogram. The fXPerCent measure is output from the matching module 30 to the integration module 4, for use later as will be described.

Next, at step 5.34 a matched PSNR (MPSNR) value is also calculated within the matching module 30. Here, the minimum error, E( ), for each matched block is used to calculate a matched signal to noise ratio according to:

$$\text{if} \left( \sum_{h=0}^{Qx-1} \sum_{v=0}^{Qy-1} E(N, Px(h), Py(v)) \right) > 0 \tag{5-12}$$

then $$MPSNR = 10\log_{10}\left( \frac{Qx*Qy*255^2}{\sum_{h=0}^{Qx-1} \sum_{v=0}^{Qy-1} E(N, Px(h), Py(v))} \right)$$

$$\text{if} \left( \sum_{h=0}^{Qx-1} \sum_{v=0}^{Qy-1} E(N, Px(h), Py(v)) \right) = 0 \tag{5-13}$$

then $MPSNR = 10\log_{10}(255)^2$

The thus determined matched PSNR for the present field/frame is then output to the integration module 4, for later use thereby to be described.

Finally, at step 5.36, horizontal, vertical and delay vectors are generated and stored for later use by the luminance and chrominance peak signal to noise ratio analyser 24 according to:

$$SyncT(h,v)=MatT(h,v)-N \; h=0 \ldots Qx-1, v=0 \ldots Qy-1 \tag{5-14}$$

$$SyncX(h,v)=MatX(h,v)-Px(h) \; h=0 \ldots Qx-1, v=0 \ldots Qy-1 \tag{5-15}$$

$$SyncY(h,v)=MatY(h,v)-Py(h) \; h=0 \ldots Qx-1, v=0 \ldots Qy-1 \tag{5-16}$$

In summary, therefore, from the above it will be apparent that for each field/frame in the test video sequence, a matched reference field/frame can be found by matching sub-elements of the field/frame with sub-elements of the fields/frames of the reference video sequence, and furthermore that matching statistic values and other measures derived from the matching process can also be output, and which are used in the integrated module 4, as will be described later.

Moreover, above we have merely described a one dimensional matching of one of either the luminance value (Y) of either of the chrominance (U or V) values. However, it should be noted that the same process is applied separately to each of the Y, U, and V pixel values to generate separate one dimensional matched sequences for each of these components of the colour space. Thus, effectively, the process of FIG. 5 is repeated separately for each of the Y pixel values, U pixel values, and V pixel values.

In alternative embodiments, of course, a single three dimensional matching process may be used, but at present the separate one dimensional matching of colour parameters is currently the preferred and tested technique for all of the matching process. Of course the matching technique as described may also be applied to other colour spaces such as YCbCr, or RGB, with only minor modifications apparent to the person skilled in the art.

Figure 5:
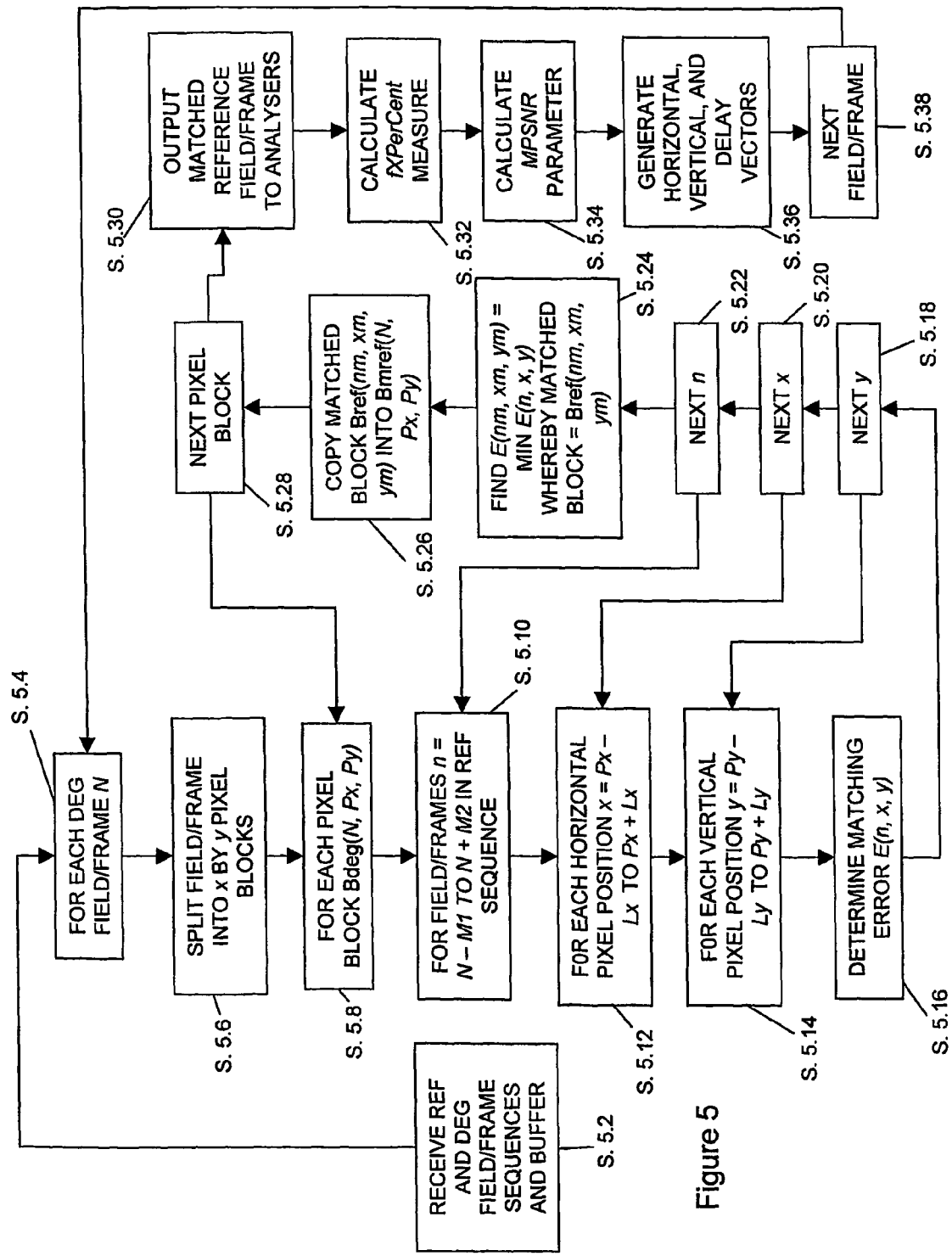
FIG. 5 is a flow diagram illustrating the steps performed in order to match the sub-field/frame elements in the embodiment of the present invention.

It should also be noted that within the above matching process of FIG. 5 certain parameters are required in order to define the search area within the reference video sequence within which a search for a particular sub-element of the present test video field/frame is to be performed. More particularly, temporal parameters M1 and M2 must be defined which specify how many preceding and succeeding frames in the reference sequence to the temporally corresponding reference video field/frame to the present test video field/frame must be searched, and in addition spatial parameters Lx and Ly are also defined in order to spatially bound the search area within each of the reference video fields/frames to be searched. The precise values of the matching parameters Lx, Ly, M1, and M2 must be set according to the properties of the video sequences to be processed. For example, the inventors have found that for 625 (720 by 576 interlaced 50 fields per second) and 525 (720 by 486 interlaced 60 fields per second) broadcast sequences then the spatial parameter Lx and Ly should be 4 pixels, whereas the temporal parameters M1 and M2 should be set to 4 and 5 fields respectively. Moreover, a matching block size of 9 by 9 pixels was also preferred.

Returning to FIG. 2, it will be seen that the matched reference sequence 34 output from the sequence matcher module 30 is input to each of the spatial frequency analyser 22, the luminance and chrominance peak signal to noise ratio analyser 24, and the edge detector analyser 26. Therefore, the operation of each of these analysers will be described next.

Referring first to the spatial frequency analyser 22, the internal configuration of the spatial frequency analyser 22 is illustrated in FIG. 6. Here, it will be seen that the spacial frequency analyser 26 comprises internally a first pyramid transform generator 222 which is arranged to receive as an input the test video fields/frames. Additionally provided is a second pyramid transform generator 224, which receives as an input the matched reference video fields/frames. The two pyramid transform generators 222 and 224 each operate identically to produce a pyramid array for each input field/frame, which is then fed to a pyramid SNR calculator 226 in order to generate a pyramid SNR measure between respective corresponding test video fields/frames and matched reference video fields/frames. The operation of the spatial frequency analyser 22 in producing the pyramid snr measures will be described next with reference to FIGS. 7 to 9.

Figure 8:
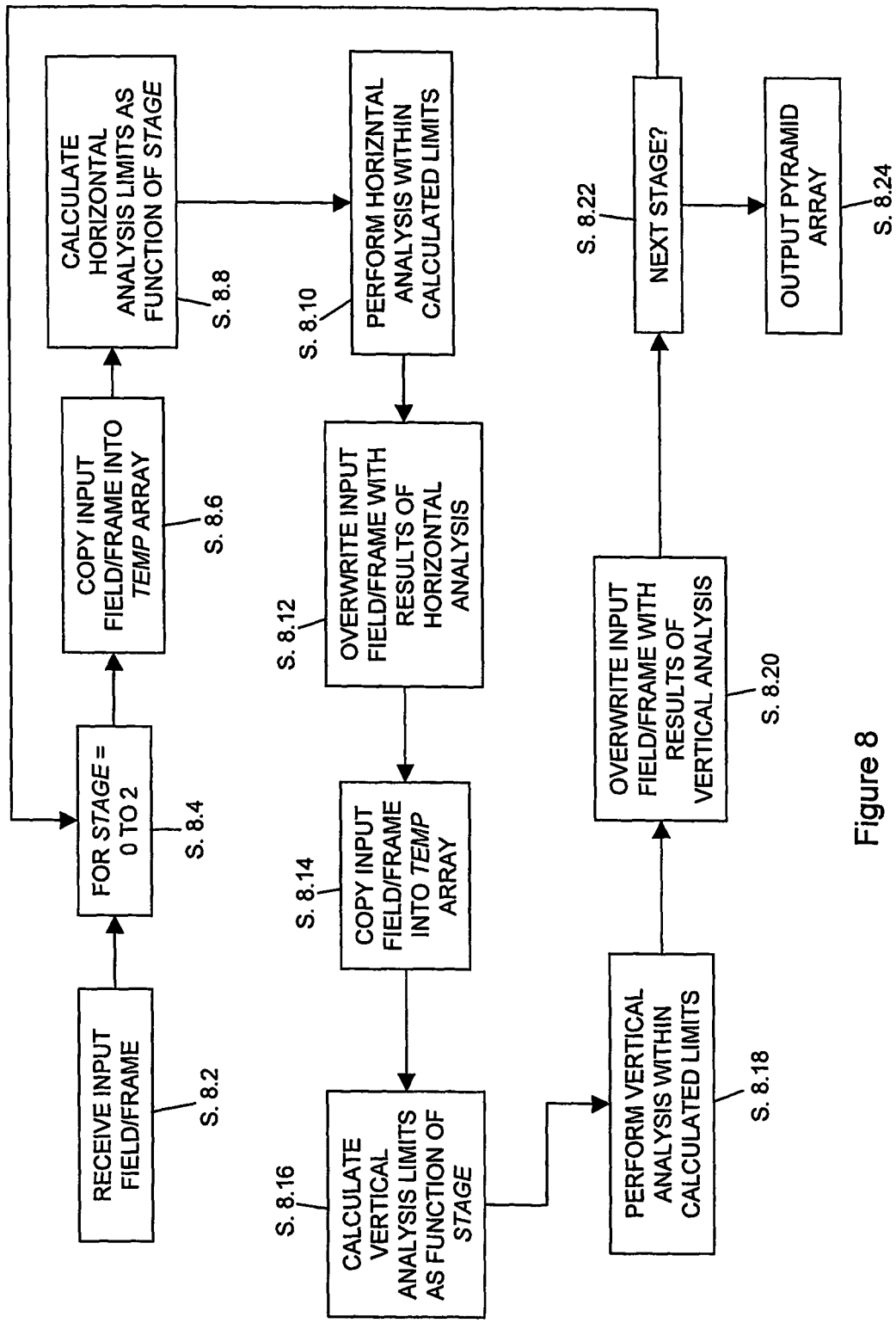
FIG. 8 is a flow diagram illustrating the steps performed in the construction of the pyramid array of FIG. 7 in the embodiment.

Referring first to FIG. 8, FIG. 8 is a flow diagram illustrating the steps performed by either of the pyramid transform generators 222 or 224 in producing respective pyramid arrays. Therefore, firstly at step 8.2 the pyramid transform generator receives an input field/frame from the respective sequence (i.e. test sequence or matched reference sequence output from the matching module 30). Then, at step 8.4 a counter stage is initialised to zero and a processing loop commenced in order to generate the pyramid array. The general procedure followed to generate the pyramid array is a three stage, two step procedure, wherein for each stage 0 to 2 horizontal analysis is performed followed by vertical analysis. The steps involved in one particular stage of horizontal and vertical analysis are described with respect to steps 8.6 to 8.20 next.

Once within the processing loop commenced at step 8.4, for a particular stage of pyramid processing the first step performed at step 8.6 is that the present field/frame being processed is copied into a temp array, as follows:—

$$PTemp(x,y)=P(x,y) \; x=0 \ldots X-1, y=0 \ldots Y-1 \quad (8\text{-}1)$$

Then, at step 8.8 the horizontal analysis limits are calculated as a function of the present value of the stage parameter as follows:—

$$Tx=X/2^{(stage+1)} \quad (8\text{-}2)$$

$$Ty=Y/2^{stage} \quad (8\text{-}3)$$

Next, horizontal analysis is performed within the calculated limits, such that averages and differences of horizontal pairs of elements of the temporary array are used to update the pyramid array according to:

$$P(x,y)=0.5*(PTemp(2x,y)+PTemp(2x+1,y)) \; x=0 \ldots \\ Tx-1, y=0 \ldots Ty-1 \quad (8\text{-}4)$$

$$P(x+Tx,y)=PTemp(2x,y)-PTemp(2x+1,y) \; x=0 \ldots \\ Tx-1 \; y=0 \ldots Ty-1 \quad (8\text{-}5)$$

and at step 8.12 the input field/frame values are overwritten with the results of the horizontal analysis.

Vertical analysis for the present stage of processing is then performed, commencing at step 8.14 wherein the input field/frame is again copied into the temp array. However, at this point it should be noted that the values within the input field/frame were overwritten at step 8.12 with the results of the horizontal analysis, and hence it will be seen that the input to the present stage of vertical analysis is the output from the immediately preceding present stage of horizontal analysis.

Next, at step 8.16 the vertical analysis limits are calculated as a function of the stage value, as follows $$Tx=X/2^{stage} \quad (8\text{-}6)$$

$$Ty=Y/2^{(stage+1)} \quad (8\text{-}7)$$

Following which vertical analysis is performed within the calculated limits according to the following, at step 8.18 so that averages and differences of vertical pairs of elements of the temporary array are used to update the pyramid array according to:

$$P(x,y)=0.5*(PTemp(x,2y)+PTemp(x,2y+1)) \; x=0 \ldots \\ Tx-1, y=0 \ldots Ty-1 \quad (8\text{-}8)$$

$$P(x,y+Ty)=PTemp(x,2y)-PTemp(x,2y+1) \; x=0 \ldots \\ Tx-1 \; y=0 \ldots Ty-1 \quad (8\text{-}9)$$

At step 8.20 the input field/frame is overwritten with the results of the vertical analysis performed at step 8.18 such that the values within the input field/frame array correspond to the results of the first stage of the spatial analysis. At step 8.22 an evaluation is performed to determine whether each of the stages of the spatial analysis to generate the pyramid array have been performed, and if not processing returns back to step 8.4, wherein the stage value is incremented, and the steps of 8.6 to 8.20 repeated once again. It should be noted that for each step of horizontal and vertical analysis at each stage, the values within the input field/frame array are overwritten with the calculated vertical and horizontal limits, such that as processing proceeds step by step through each stage, the values held within the input field/frame array are converted into a pyramid structure each of four quadrants at each level. Thus, by the time each of the stages 0 to 2 has been completed, such that the evaluation at step 8.22 causes the processing loop to end, a pyramid array has been constructed which can be output at step 8.24.

The format of the constructed pyramid array at the end of each processing stage is shown in FIG. 7. More particularly, FIG. 7(a) illustrates the contents of the input field/frame array after the end of the stage 0 processing whereupon it will be seen that the horizontal analysis step followed by the vertical analysis step causes the array to be split into four quadrants Q(stage, 0 to 3) wherein Q(0, 0) contains values corresponding to the average of blocks of 4 pixels of the input field/frame, Q(0,1) contains values corresponding to the horizontal difference of blocks of 4 pixels of the input field/frame, Q(0, 2) contains values corresponding to the vertical difference of blocks of 4 pixels, and Q(0, 3) contains values corresponding to the diagonal difference of blocks of 4 pixels.

The quadrant Q(0,0) output from the stage 0 analysis as shown in FIG. 7(a) is then used as the input to the second iteration of the FOR loop to perform the stage one processing, the results of which are shown in FIG. 7(b). Here it will be seen that the quadrant Q(0, 0) has been overwritten by results Q(1, 0 to 3) which relate to the analysis of 4 by 4 pixel blocks, but wherein each quadrant Q(1, 0 to 3) contains values relating to the average, horizontal difference, vertical difference, and diagonal difference as previously described in respect of the stage 0 output.

The output of the stage 1 analysis as shown in FIG. 7(b) is used as the input to the stage 2 analysis in the third iteration of the FOR loop of FIG. 8, to give the results shown in FIG. 7(c), where it will be seen that the quadrant Q(1, 0) has been overwritten by the quadrants Q(2, 0 to 3), where each of the quadrants Q(2, 0 to 3) relates to the average of blocks, horizontal difference of blocks, etc. respectively as described previously. After the three stages of analysis, the resulting pyramid array as shown in FIG. 7(c) has a total of ten blocks of results, being three blocks Q(0, 1 to 3) from the stage 0 (2 by 2 pixel) analysis, three quadrants Q(1, 1 to 3) from the stage 1 (4 by 4 pixel) analysis, and four quadrants Q(2, 0 to 3) from the stage 2 (8×8 pixel) analysis. It should be noted that the procedure of FIG. 8 to produce the pyramid arrays as shown in FIG. 7 is performed by each of the pyramid transform generators 222 and 224 to produce respective pyramid arrays pref and pdeg which are then input to the SNR calculator 226. The operation of the pyramid SNR calculator 226 is shown in FIG. 9.

Figure 9:
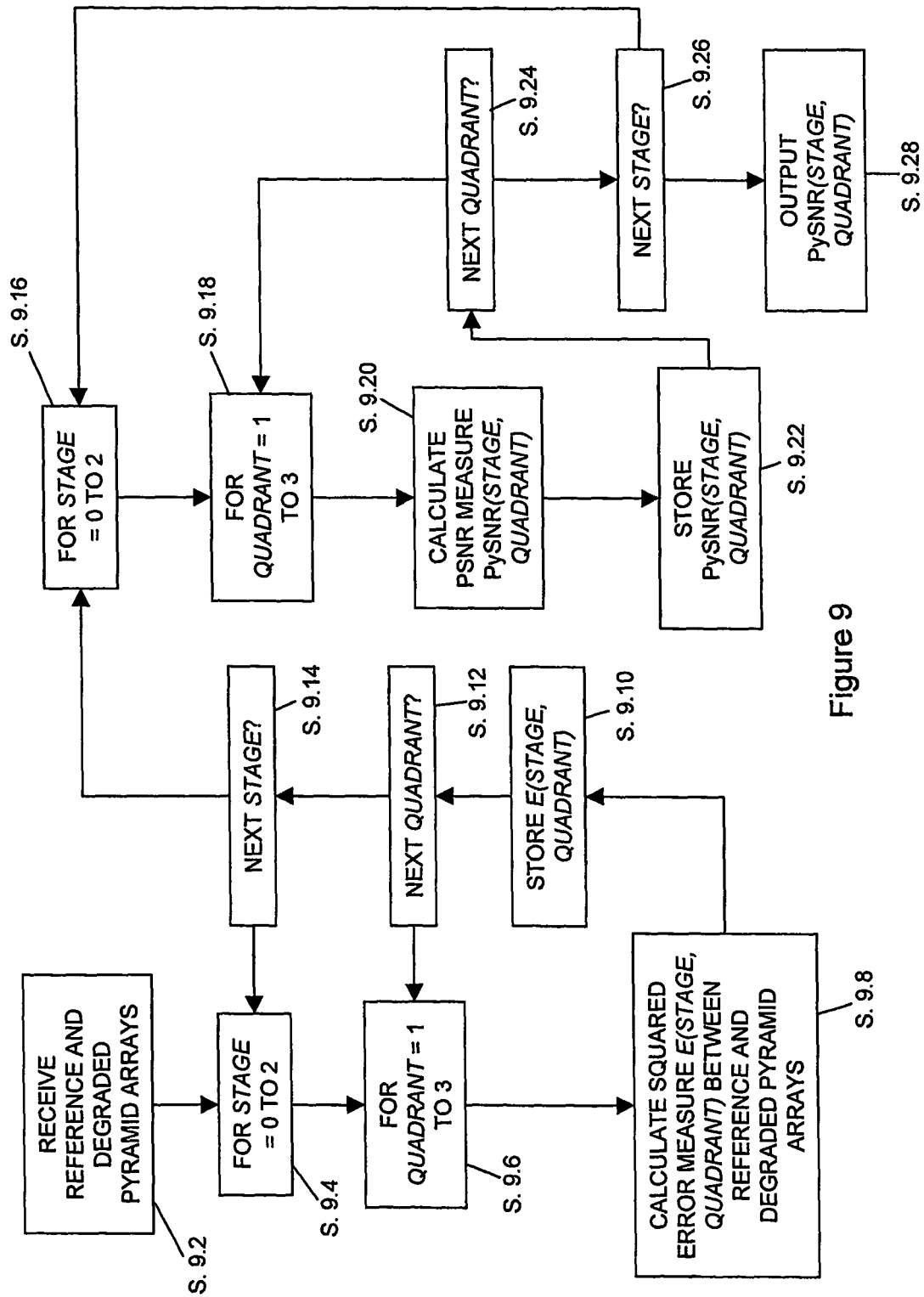
FIG. 9 is a flow diagram illustrating the steps performed in performing the spatial analysis on the pyramid array within the embodiment of the invention.

With reference to FIG. 9, firstly at step 9.2 the pyramid SNR calculator 226 receives the reference and degraded pyramid arrays from the pyramid transform generators 224 and 222 respectively. Next, at step 9.4 a processing loop is commenced which processes each value of the counter value stage from 0 to 2. Following this, a second, nested, processing loop which processes a counter value quadrant between values of 1 to 3 is commenced at step 9.6. Within these nested processing loops at step 9.8 a squared error measure value E(stage, quadrant) is calculated between the reference and pyramid arrays, according to:

$$E(s, q) = (1/XY^2) \sum_{x=x1(s,q)}^{x2(s,q)-1} \sum_{y=y1(s,q)}^{y2(s,q)-1} (Pref(x, y) - Pdeg(x, y))^2 \quad (9\text{-}1)$$

$$s = 0\ldots 2 \quad q = 1\ldots 3$$

where x1, x2, y1 and y2 define the horizontal and vertical limits of the quadrants within the pyramid arrays and are calculated according to:

$$x1(s,1)=X/2^{(s+1)} \, x2(s,1)=2*x1(s,1) \, y1(s,1)= 0 \, y2(s,1)=Y/2^{(s+1)} \quad (9\text{-}2)$$

$$x1(s,2)=0 \, x2(s,2)=X/2^{(s+1)} \, y1(s,2)= Y/2^{(s+1)} \, y2(s,2)=2*y1(s,2) \quad (9\text{-}3)$$

$$x1(s,3)=X/2^{(s+1)} \, x2(s,3)=2*x1(s,3) \, y1(s,3)= Y/2^{(s+1)} \, y2(s,3)=2*y1(s,3) \quad (9\text{-}4)$$

Each calculated error measure E(stage, quadrant) is then stored at step 9.10, following which at steps 9.12 and 9.14 the values of the quadrant and stage counters are updated as appropriate to the processing loops. The operation of the processing loops of step 9.4 to 9.14 and step 9.6 to step 9.12 is to calculate an error measure value for each value of the counter stage and the counter quadrant.

Having calculated the squared error measure values, at step 9.16 a further processing loop to process all the available values of the counter stage from 0 to 2 is commenced, following which at step 9.18 a nested processing loop to process the values of the quadrant counter 1 to 3 is commenced. Within these nested processing loops at step 9.20 a PSNR measure PySNR(stage, quadrant) is calculated according to:—

$$\text{if}(E>0.0) \, PySNR(s,q)=10.0*\log_{10}(255^2/E(s,q)) \text{ else} \\ SNR=10.0*\log_{10}(255^2*XY^2) \quad (9\text{-}5)$$

which is then stored at step 9.22. At steps 9.24 and subsequent step 9.26 the values of the counters stage and quadrant are incremented as appropriate to the processing loops, such that the effect of the nested processing loops is to calculate and store the PSNR measure for each value of stage and each value of quadrant. Given that the parameter stage can take values of 0 to 2, and the parameter quadrant may take values of 1 to 3, it will be seen that a total of 9 PSNR measures are generated by the pyramid SNR calculator 226, all of which may be output to the integration stage 4.

The operation of the edge analyser 26 will now be described with respect to FIGS. 10 and 11.

Figure 10:
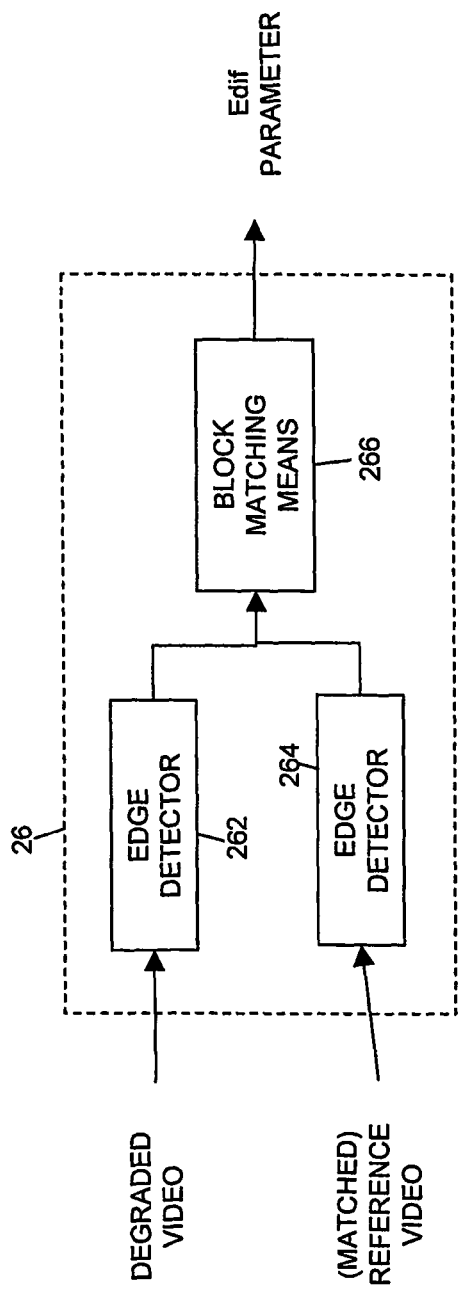
FIG. 10 is a block diagram of the edge analyser used within the embodiment.

FIG. 10 illustrates the internal configuration of the edge analyser 26. More particularly, the edge analyser 26 comprises a first edge detector 262 arranged to receive and test the video fields/frames, and to detect edges therein, and a second edge detector 264 arranged to receive the matched reference video fields/frames output from the matching module 30, and to detect edges therein. Both the edge detectors 262 and 264 preferably operate in accordance with known edge detection algorithms and produce edge maps in a manner already known in the art. For example, examples of known edge detection algorithms are Laplacian edge detectors, Canny edge detectors, and Rothwell edge detectors. Source code in the C programming language for a Canny edge detector was available for free download via ftp before the priority date from ftp://figment.csee.usf.edu/pub/Edge Comparison/source code/canny.src whereas source code in C for a Rothwell edge detector was available from ftp://figment.csee.usf.edu/pub/Edge Comparison/source code/rothwell.src.

The respective edge maps produced by each of the edge detectors 262 and 264 are input to a block matching means 266 which acts to compare the respective edge maps in a manner to be described, and to produce an output parameter EDif, representative of the comparison. The operation of the edge analyser 26 is shown in more detail in FIG. 11.

Figure 11:
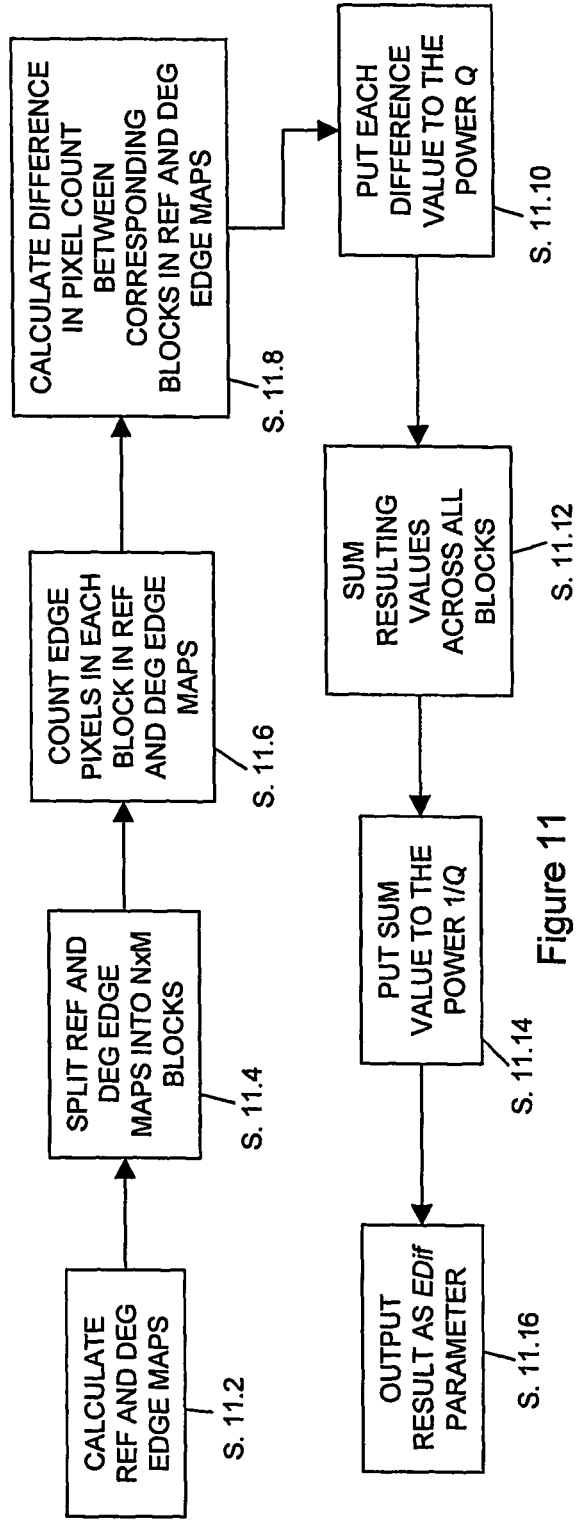
FIG. 11 is a flow diagram illustrating the steps performed by the edge analyser in the embodiment of the present invention.

With reference to FIG. 11, firstly, at step 11.2 the respective edge detectors 262 and 264 calculate respective reference and degraded edge maps. As mentioned above, the edge detection algorithm used by the edge detectors 262 and 264 is preferably one which is known in the art, such as a Canny edge detector. The edge detectors 262 and 264 output the reference and degraded edge maps to the block matching means 266, wherein at step 11.4 each of the reference and degraded edge maps are split into N by M blocks. Next, the block matching means 266 acts to count each pixel which forms part of an edge within each block in both of the reference and the degraded edge maps. Thus, after step 11.6 the block matching means 266 has obtained a count of edge pixels for each block in each of the reference and degraded edge maps.

Following the counting step, at step 11.8 the block matching means 266 calculates the difference in respective pixel counts between corresponding blocks in the reference and the degraded edge maps. Therefore, after step 11.8 as many difference values as there are blocks in one of the reference or degraded edge maps will have been obtained.

Following step 11.8, at step 11.10 the block matching means 266 puts each difference value to the power Q and at step 11.12 the resulting values are summed. Therefore, after step 11.10 there are still as many values as there are blocks in one of the reference or degraded edge maps, but after step 11.12 a single result is obtained corresponding to a sum of the values calculated at step 11.10. At step 11.14, the resulting sum value is then put to the power 1/Q, and at step 11.16 the result of this calculation is output from the block matching means 266 as the EDif parameter. As will be seen from FIG. 2, the EDif parameter is output from the edge analyser 26 to the integration stage 4. Use of the EDif parameter within the integration stage will be described later.

It may be useful in some situations to take into account analysis offsets from the field/frame edges in the edge differencing steps of 11.6 to 11.16, in which case the processing then becomes as follows.

After producing the respective edge maps, the block matching means then calculates a measure of the number of edge-marked pixels in each analysis block, where nX and nY define the number of non-overlapping blocks to be analysed in the horizontal and vertical directions and X1 and Y1 define analysis offsets from the field edge.

$$Bref(x, y) = \sum_{i=i1}^{i2} \sum_{j=j1}^{j2} EMapRef \quad (Nx + X1 + i, My + Y1 + j)$$ (11-1)

$$x = 0 \ldots nX - 1, y = 0 \ldots nY - 1$$

$$BDeg(x, y) = \sum_{i=i1}^{i2} \sum_{j=j1}^{j2} EMapDeg \quad (Nx + X1 + i, My + Y1 + j)$$ (11-2)

$$x = 0 \ldots nX - 1, y = 0 \ldots nY - 1$$

The summation limits are determined according to:

$$i1 = -(N \text{ div } 2) \, i2 = (N-1)\text{div}2 \quad (11\text{-}3)$$

$$j1 = -(M \text{ div } 2) \, j2 = (M-1)\text{div}2 \quad (11\text{-}4)$$

where the "div" operator represents an integer division.

Then, a measure of the differences over the whole field is calculated according to:

$$EDif = (1/(N * M * nX * nY)) * \left( \sum_{x=0}^{nX-1} \sum_{y=0}^{nY-1} (BRef(x, y) - BDeg(x, y))^Q \right)^{1/Q} \quad (11\text{-}5)$$

For 720×288 pixel fields for 625 broadcast video:

$$N=4, X1=6, nX=178, M=4, Y1=10, nY=69, Q=3 \quad (11\text{-}6)$$

Whereas for 720×243 pixel fields for 525 broadcast video:

$$N=4, X1=6, nX=178, M=4, Y1=10, nY=58, Q=3 \quad (11\text{-}7)$$

It should be noted that the above processing represented by equations 11-1 to 11-7 is substantially identical with that already described in respect of FIG. 11, with the differences that the analysis offsets from the field/frame edges are taken into account. The parameter Edif found by equation 11-5 is output to the integration stage 4 in the same manner as previously described.

The operation of the texture analyser 28 will now be described with respect to FIG. 12.

Digital video compression tends to reduce the texture or detail within the an image by the quantisation of the DCT coefficients used within the coding process. Texture analysis can therefore yield important information on such compression, and is used within the present embodiment to provide a video characteristic value TextureDeg and/or TextureRef. More particularly, the texture parameter values TextureDeg and/or TextureRef are measured by recording the number of turning points in the intensity signal along horizontal picture lines. This is performed as shown in FIG. 12.

Figure 12:
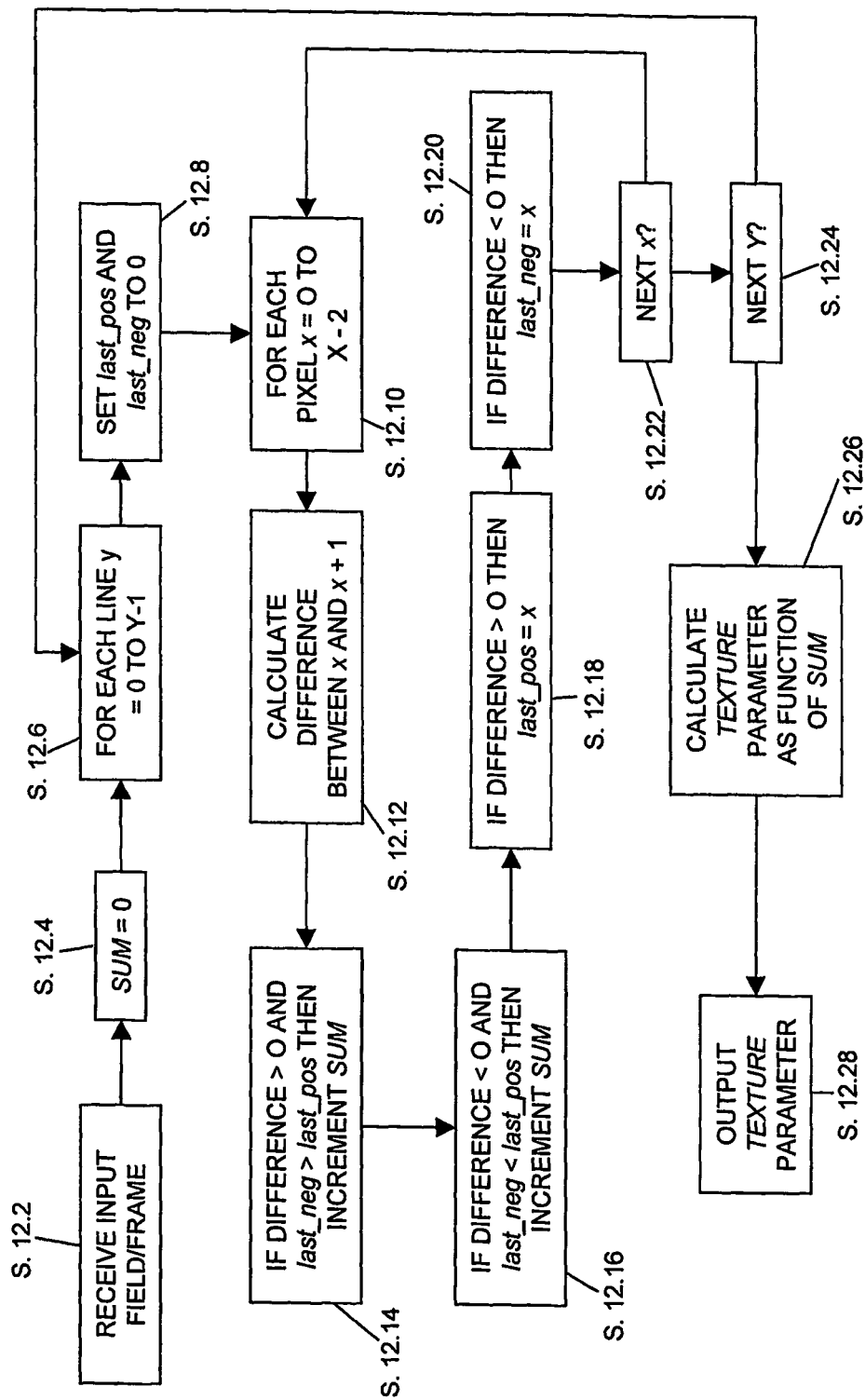
FIG. 12 is a flow diagram illustrating the steps performed by the texture analyser of the embodiment of the present invention.
Figure 13:
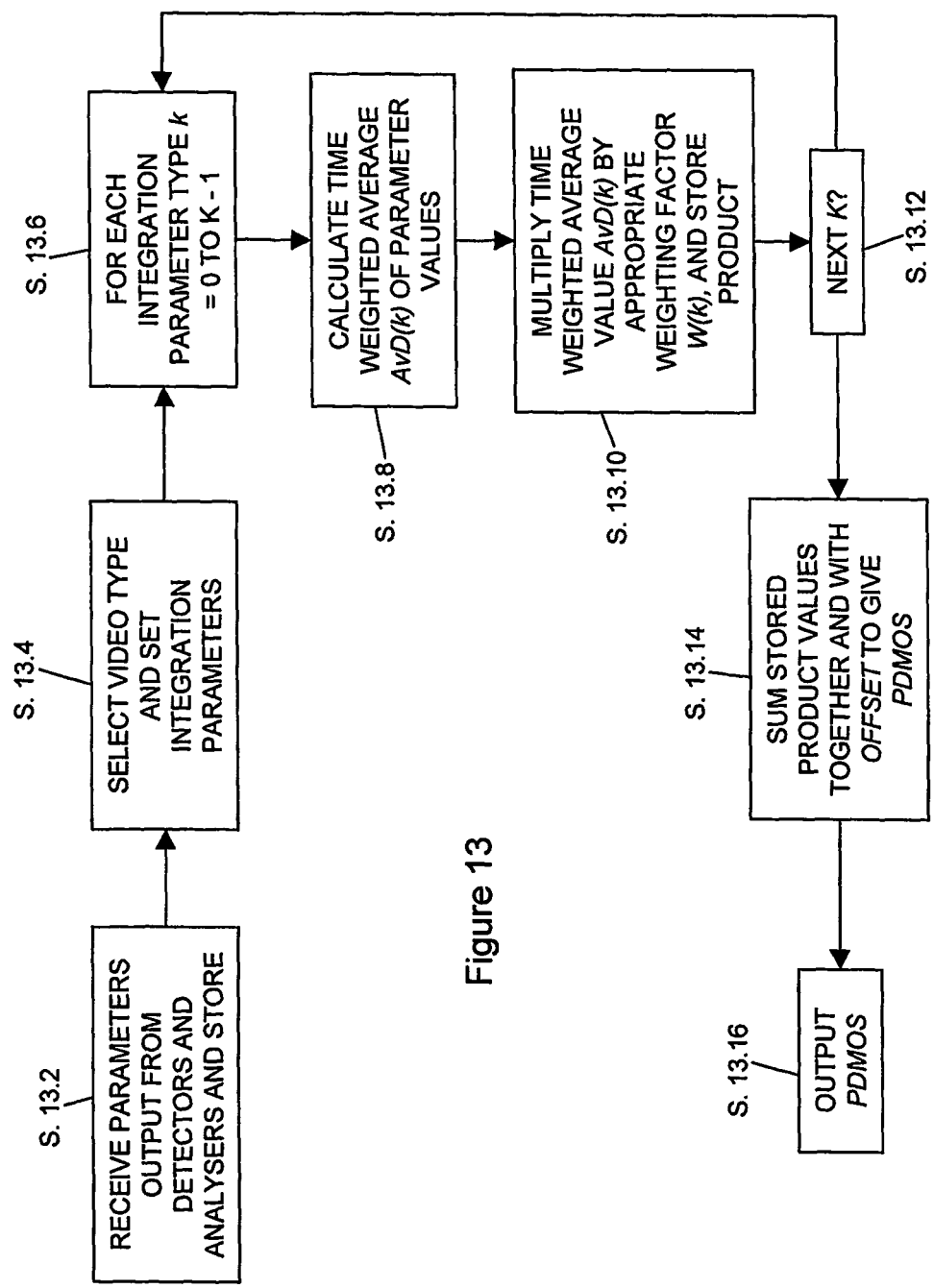
FIG. 13 is a flow diagram illustrating the steps performed by the integrator of the embodiment of the present invention.

With reference to FIG. 12, firstly at step 12.2 the texture analyser 28 receives the present test field/frame to be processed. From FIG. 2 it will be recalled that the texture analyser 28 receives the test video field/frame from the crop and offset module 32, but does not receive either the matched reference field/frame or the original reference field/frame. However, in other embodiments the texture analyser 28 may receive either of the matched reference field/frame or the original reference field/frame in which case a TextureRef parameter may be calculated in the identical manner to be described below in respect of the TextureDeg parameter.

Following step 12.2, at step 12.4 a turning point counter sum is initialised to zero. Then, at step 12.6 a processing loop is commenced for each line within the input video field/frame loop within the limits loop=0 to Y−1, wherein Y is the number of lines within the video field/frame. Within the processing loop, at step 12.18 values last_pos, and last_neg are both initialised to 0. Next, at step 12.10 a second, nested, processing loop is commenced to process each pixel x within each line y, where x takes the value of 0 to X−2, wherein X is the number of pixels in a line of the input video field/frame.

Within the nested processing loop, at step 12.12 a difference value is calculated between the pixel value at position x, and the pixel value at position x+1. Then, at step 12.14 an evaluation is performed to determine whether or not the calculated difference value is greater than 0, and also as to whether or not the value last_neg is greater than the value last_pos. If this logical condition is met then the counter value sum is incremented. Following step 12.14, at step 12.16 a second evaluation is performed to determine whether or not the difference value calculated at step 12.12 is less than 0, and as to whether or not the value last_neg is less than the value last_pos. If this is the case then the counter value sum is incremented. It will be noted that the evaluations of step 12.14 and step 12.16 are mutually exclusive, and that it is not possible for the counter value sum to be incremented twice for any single particular pixel. After step 12.16, at step 12.18 a further evaluation is determined as to whether or not the calculated difference value is greater than zero, in which case the value last_pos is set to be the number of the current pixel x. Alternatively at step 12.20 a second evaluation is performed which evaluates as to whether or not the calculated difference value is less than zero, in which case the counter value last_neg is set to be the current pixel number x.

Following step 12.20, at step 12.22 an evaluation is performed to determine whether or not all of the pixels x within the present line have been processed, and if not then processing proceeds back to step 12.10 wherein the next pixel is processed. However, if all of the pixels have been processed then processing proceeds to step 12.24, wherein an evaluation is made to determine whether or not all of the lines y have been processed in the present input frame, and if not then processing proceeds back to step 12.6, when processing of the next line is commenced. The results of these nested processing loops are that each pixel on each line is processed, and whenever the evaluations of steps 12.14 and steps 12.16 return true the counter sum is incremented. Therefore, after the processing loops have finished, the counter sum will contain a certain value which is indicative of the texture turning points within the input field/frame.

Using this value held within the counter sum, at step 12.26 a texture parameter is calculated as a function of the value held in the counter sum, as follows:

$$\text{Texture} = \text{sum} * 100 / XY \qquad (12\text{-}1)$$

The texture parameter thus calculated may be output from the texture analyser 28 to the integrator stage 4 at step 12.28.

As mentioned, although FIG. 2 illustrates the texture analyser 28 receiving only the degraded video fields/frames, and hence producing a TextureDeg parameter value only, in other embodiments the texture analyser 28 may receive either of the reference video fields/frames or the matched reference video fields/frames in addition, wherein the above processing steps may be applied to such fields/frames to produce TextureRef, or TextureMref parameters in addition.

The operation of the luminance and chrominance peak signal to noise ratio analyser 24 will now be described.

As shown in FIG. 2, the luminance and chrominance peak signal to noise ratio analyser 24 receives the matched reference video fields/frames and the degraded video fields/frames as inputs. These can then be used in the intensity and colour signals to noise ratio measures according to the following, where RefY and DegY are fields of matched reference and degraded intensity and RefU, DegU, RefV and DegV are fields of chrominance according to YUV standard colour format:—

$$YPSNR = 10.0 * \log_{10}\left(\frac{255^2 * XY}{\left(\sum_{x=0}^{X-1}\sum_{y=0}^{Y-1}(RefY(x,y) - DegY(x,y))^2\right)}\right) \qquad (2\text{-}1)$$

$$UPSNR = 10.0 * \log_{10}\left(\frac{255^2 * XY}{\left(\sum_{x=0}^{X-1}\sum_{y=0}^{Y-1}(RefU(x,y) - DegU(x,y))^2\right)}\right) \qquad (2\text{-}2)$$

$$VPSNR = 10.0 * \log_{10}\left(\frac{255^2 * XY}{\left(\sum_{x=0}^{X-1}\sum_{y=0}^{Y-1}(RefV(x,y) - DegV(x,y))^2\right)}\right) \qquad (2\text{-}3)$$

Of course, in other embodiments of the invention which do not use the YUV colour model, such as RGB, and YCbCr, then of course similar corresponding measurements may be calculated as will be apparent to those skilled in the art.

Additionally, the luminance and chrominance peak signal to noise ratio analyser 24 also uses the sets of matching vectors generated in the matching module 30 to generate a segmental PSNR measure SegVPSNR, relating to the V values of the pixels when a YUV colour model is used. More particularly, a matched signal to noise ratio is calculated for the pixel V values by use of the matching vectors defined in (5-14) to (5-16), above. For each set of matching vectors, an error measure, VE, is calculated by the luminance and chrominance peak signal to noise ratio analyser 24 according to:

$$VE(h,v) = (1/bx*by)\sum_{i=0}^{bx-1}\sum_{j=0}^{by-1}(DegV(N, Px(h)+i, \qquad (2\text{-}4)$$

$$Py(h)+j) - RefV(N + SyncT(h,v),$$

$$Px(h) + SyncX(h,v) + i,$$

$$Py(v) + SyncY(h,v) + j))^2$$

and a segmental PSNR measure is then calculated for the field according to:

$$SegVPSNR = (1/Qx*Qy)\sum_{h=0}^{Qx-1}\sum_{v=0}^{Qy-1}10.0*\log_{10} \qquad (2\text{-}5)$$

$$(255^2/(VE(h,v)+1))$$

The segmental PSNR measure SegVPSNR is then output to the integration module 4 for later use to be described.

Returning to FIG. 1, the various outputs from the matching module and analysers within detector module 2 are fed to an integration stage 4, wherein the various values are integrated together to give a video quality value 10. The operation of the integration stage 4 will now be described with respect to FIG. 13.

Generally, the operation of the integration stage is to produce an estimate of the perceived video quality of the test video sequence by the appropriate weighting of a selection of the video characteristic parameter values produced by the analysers 22 to 28. The particular set of parameter values used and the values of the corresponding weighting factors depend upon the particular type of video being tested, and are determined in advance by prior calibration. The calibrations are performed on a large set of video sequences that have known subjective scores, and preferably have properties similar to the degraded sequences to be tested.

The general form of the integration procedure firstly time weights the field/frame by field/frame detection parameters, and then combines the time-weighted and averaged values to give a predicted quality score, being the overall video quality value. The process to achieve this is set out in FIG. 13.

Firstly, the integration stage 4 receives the parameter values output from the various detectors and analysers at step 13.2 and stores them. As has been described previously, the matching module 30 may output the various PerCent and MPSNR values, the spatial frequency analyser 22 outputs the PySNR values, while the luminance and chrominance peak signal to noise ratio analyser 24 outputs PSNR values for each of the luminance and chrominance characteristics in the colour model being used, as well as the SegVPSNR value calculated from the matching vectors. Moreover, the edge analyser 26 outputs the EDif parameter as described previously, whereas the texture analyser 28 gives the values TextureDeg at least, but might also output values TextureRef and TextureMref if appropriate. Whatever parameters and values have been output by each of the earlier stages in respect of a particular test video field/frame, the integration stage receives the output information and stores it.

Next, at step 13.4 the integration stage selects the video type, and as a result selects a set of integration parameters in dependence on the video type. For example, a set of integration parameters for 720 by 288 pixel per field 625 broadcast video that has been MPEG encoded at between 1 Mbits per second and 5 Mbits per second is given below:

TABLE 2

Integration parameters for 625 broadcast video.

| K | Parameter name | W |
|---|---|---|
| 0 | TextureDeg | −0.68 |
| 1 | PySNR(3,3) | −0.57 |
| 2 | EDif | +58913.294 |
| 3 | fXPerCent | −0.208 |
| 4 | MPSNR | −0.928 |
| 5 | SegVPSNR | −1.529 |
| Offset | +176.486 | |
| mnk | 1.0 | |
| N | 400 | |

Whereas the weighting values for 525 line video are:—

TABLE 3

Integration parameters for 525 broadcast video.

| K | Parameter name | W |
|---|---|---|
| 0 | TextureDeg | +0.043 |
| 1 | PySNR(3,3) | −2.118 |
| 2 | EDif | +60865.164 |
| 3 | FXPerCent | −0.361 |
| 4 | MPSNR | +1.104 |
| 5 | SegVPSNR | −1.264 |
| Offset | +260.773 | |
| mnk | 1.0 | |
| N | 480 | |

The precise values of the various weighting factors are determined in advance by calibration, as described. Moreover, each set of integration parameters is stored within the integration stage 4 in look-up tables or the like.

Having selected the video type and set the integration parameters from the stored look-up tables, at step 13.6 a processing loop is commenced in order to process each integration parameter type k within the values 0 to K−1, wherein each parameter (k) is a particular one of the parameters received from the various analysers or the matching module. Within the processing loop, at step 13.8 firstly a time weighted average AvD(k) of the parameter values is calculated according to the following:—

$$AvD(k) = (1/N) * \left( \sum_{n=0}^{N-1} D(k,n)^{mnk} \right)^{1/mnk} \quad (13\text{-}1)$$

where N is the number of fields, D(k, n) is the n'th field of the k'th detection parameter, and mnk is a weighting factor. Next, at step 13.10 the time weighted average value AvD(k) is multiplied by the appropriate weighting factor w(k), and the product stored. The appropriate weighting factor w(k) is read from the appropriate look up table for the video type stored in the integration stage 4.

At step 13.12 an evaluation is performed to determine whether or not all of the integration parameters (k) have been processed, and if not the processing loop of step 13.6 is performed again until all of the parameters have been processed. Once all the parameters have been processed then an appropriately weighted time weighted average value will be available for each type of parameter k, which are then summed together at step 13.14 with an offset value as follows:—

$$PDMOS = \text{Offset} + \sum_{k=0}^{K-1} AvD(k) * W(k) \quad (13\text{-}2)$$

where K equals the number of parameters used in the integration and is 6 for the examples shown in Tables 2 and 3. This gives a final video quality value PDMOS, which is then output at step 13.16.

The output video quality value PDMOS is equivalent to a rating produced by subjective testing using human observers, in that it has been produced taking into account distortions and errors in the test video signal which are substantially perceptually undetectable by human observers. Therefore, in view of this property the video quality value may be put to a number of uses. In particular, it may be used to evaluate the quality of an existing video service to ensure that the quality is adequate, or alternatively it may be used to test the performance of different video codecs. Additionally, the video quality value may be used to evaluate the performance of new video services, such as broadband-style video services over the Internet. In this respect, the video quality level PDMOS generated by the embodiment of the present invention may be put to any similar use as those automated quality assessment values generated by the prior art, with the difference that as the value takes into account perceptually insignificant distortions, it is much more likely to represent a video quality value generated by human viewers during subjective tests then has heretofore been the case with prior art automated video quality assessment techniques.

Figure 14:
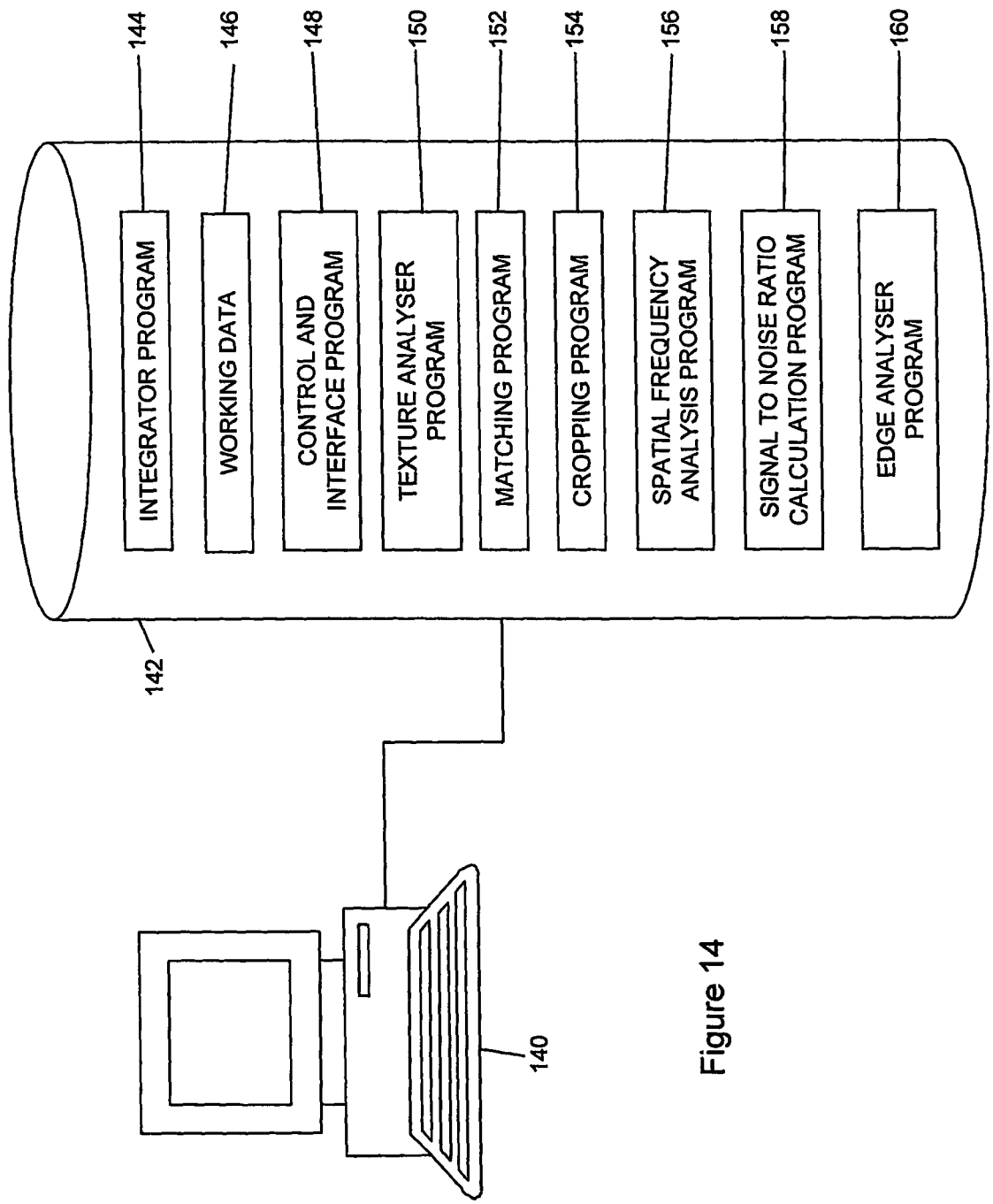
FIG. 14 is a diagram illustrating a second, software-based embodiment of the present invention.

FIG. 14 illustrates a second embodiment of the present invention, being one that is implemented in software. Here, the various processes provided by the present invention are performed by a computer 140, which is arranged to receive both the reference video sequence, and the test video sequence. The computer 140 is provided with a program storage device such as a hard disk drive, writable CD or DVD, memory or the like, in which are stored various computer programs which contain instructions which when executed by the computer 140 cause the computer to perform the present invention. More particularly, a control and interface program 148 is provided which when run allows a user of the computer to control the computer to begin to process test and reference video sequences in accordance with the invention, and to allow the computer to output the test results to the user on the screen. Such a control and interface program is preferably graphically based, and the arrangement of such a program would be apparent to one skilled in the art.

Additionally provided is an integrator program 144, a control and interface program 148, a texture analyser program 150, a matching program 152, a cropping program 154, a spatial frequency analysis program 156, a signal to noise ratio calculation program 158, and an edge analyser program 160. The operations of each of these programs will be briefly discussed below in the context of an example operation.

Imagine that a user of the general purpose computer 140 wishes to test a video sequence. The user first of all starts the control and interface program 148, which provides controls to the user to allow the user to specify the test and reference video sequences to be processed. Once the user has instructed the computer 140 to commence processing via the control and interface program 148, the control and interface program 148 then causes the computer 140 to commence processing, by causing various of the other programs to be excuted and to process data as appropriate. Therefore, upon receiving instructions from the user to commence processing the control and interface program 148 firstly causes the cropping program 154 to execute, which acts to crop the input reference and test video sequences in exactly the same manner as already described in respect of the crop and offset module 32. That is, the cropping program 145 operates to crop the input video sequences in the same manner as previously described in respect of FIG. 3. The thus cropped video sequences are then stored in a working data area 146 of the data storage device 142.

Following cropping of the input video sequences, next the control and interface program 148 causes the matching program 152 to run. The matching program 152 accesses the cropped reference and test video sequences in the working data portion 146 of the storage device 142, and acts to perform sequence matching in exactly the same manner as the sequence matcher module 30 as previously described with respect to FIGS. 4 and 5. That is, the matching program 152 operates according to the flow diagram of FIG. 5 to produce the matched reference sequence, which is then stored within the working data portion 146 of the data storage device 142.

Having generated the matched reference sequence, the control and interface program 148 then launches the spatial frequency analysis program 156, which operates to perform spatial frequency analysis on the matched reference fields/frames and the test fields/frames in exactly the same manner as the spatial frequency analyser 22 as previously described, and therefore the spatial frequency analysis program 156 operates to perform the flow diagrams of both FIGS. 8 and 9 so as to generate the PySNR video characteristic values, which are then stored in the working data portion 146 of the storage device 142.

Next, the control and interface program 148 launches the signal to noise ratio calculation program 158, which then accesses the test video fields/frames and the matched reference video fields/frames within the working data portion 146, and calculates luminance and chrominance signal to noise ratios in the previous manner as described. That is, the signal to noise ratio calculation program 158 operates in an identical manner to the luminance and chrominance peak signal to noise ratio analyser 24 as previously described. The resultant luminance and chrominance signal to noise ratios calculated by the signal to noise ratio calculation program 158 are stored in the working data area 146 of the storage device.

The control and interface program 148 then launches the texture analyser program 150. The texture analyser program 150 then accesses the test video fields/frames from the working data area 146, and acts to calculate the TextureDeg parameter in the same manner as previously described in respect of the texture analyser 28. Therefore, the texture analyser program 150 operates in accordance with the flow diagram of FIG. 12. If required the texture analyser program may also calculate TextureRef and TextureMref parameters in addition, and in the same way.

Following the operation of the texture analyser program 150, the control and interface program 148 then launches the edge analyser program 160. The edge analyser program acts to access the matched reference fields/frames within the working data area 146 of the storage device 142, as well as the test video fields/frames. Then, the edge analyser program 160 operates substantially as described previously in respect of the edge analyser 26, that is the edge analyser program 160 substantially performs the steps set out in the flow diagram of FIG. 11. The output of the edge analyser program is the EDif parameter, which is stored in the working area 146.

At this stage in the operation of the second embodiment, each of the analyser programs has been executed, and the working area 146 therefore contains all of the video characteristic parameter values which may be used as inputs for an integrator. Therefore, the next operation is that the control and interface program 148 launches the integrator program 144, which acts to access the working area 146 to read the characteristic parameter values therefrom as appropriate, and to integrate the parameters together in order to generate the final video quality value PDMOS. The operation of the integrator program 144 is substantially identical to that of the integrator stage 4 as previously described. Therefore, the integrator program 144 operates substantially in accordance with the flow diagram of FIG. 13, as previously described.

The second embodiment of the invention therefore provides a software embodiment, which acts to generate the video quality value in substantially the same manner as previously described in respect of the first embodiment. It should be noted here, however, that the first embodiment as described may also be implemented in software or alternatively may be implemented with hardware elements or a mixture of both software and hardware. In this respect, the first embodiment should be considered to be a more general embodiment than the second embodiment.

Various other modifications may be made to the described embodiments to provide further embodiments. For example, in a further embodiment the matching process may be performed using different block sizes. In particular, an error minimisation block size greater than the reconstructed block size would give error minimisation for over-lapping windows, with some pixels being considered for the matching of more than one degraded block. Within such a process the matching module would still act to split the test video field/frame up into the same number of blocks as previously described, but would then define a matching element which wholly contained the pixels of the block to be matched, but which also contained further pixels surrounding the block to be matched. This matching element would then be used in the error minimisation function to find a matching block within the reference sequence to the block to be matched. This may give benefits by increasing the accuracy of the matching.

The matching process used in the present invention above can overcome the effects of a number of different types of distortion, from consistent and regular field misalignments through to warping and more transient block-based degradations. Differences between the sensitivity of PSNR and matched PSNR measures to various distortions are now presented to illustrate the benefits of the matching process. All presented results are for luminance intensity pixel values only.

Dealing first with spatial misalignment artefacts, spatial misalignment between the reference and degraded fields, by just one pixel, can have a significant impact on SNR measures whilst being imperceptible to a viewer. The matching process provided by the invention can handle both consistent and time-varying spatial offsets up to the perceptual-based search limits set within the algorithm.

Figure 15:
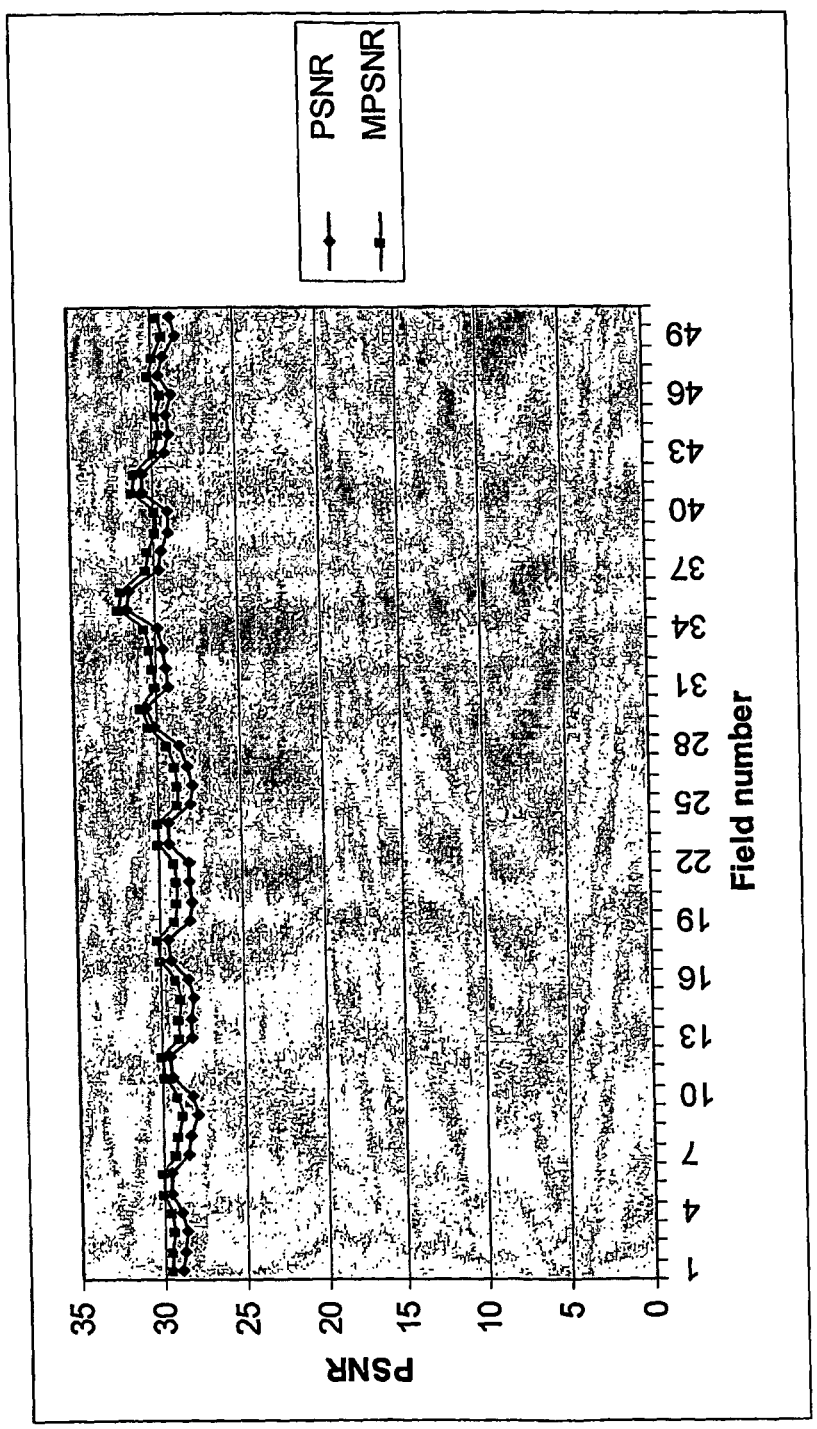
FIG. 15 is a graph illustrating calculated PSNR for no spatial offset (3 Mb/s MPEG2 encoding)

FIG. 15 shows PSNR results calculated from a 625 sequence that has been MPEG2 encoded to 3 Mb/s and the reference and degraded sequences spatially (and temporally) aligned. The PSNR plot shows basic PSNR calculated between each field of the reference and degraded according to:

$$PSNR(n) = 10\log_{10}\left(X*Y*255^2 \Big/ \left(\sum_{i=0}^{X-1}\sum_{j=0}^{Y-1}(ref(n,i,j)-deg(n,i,j))^2\right)\right) \quad (15\text{-}1)$$

where X and Y are the field pixel dimensions.

Figure 16:
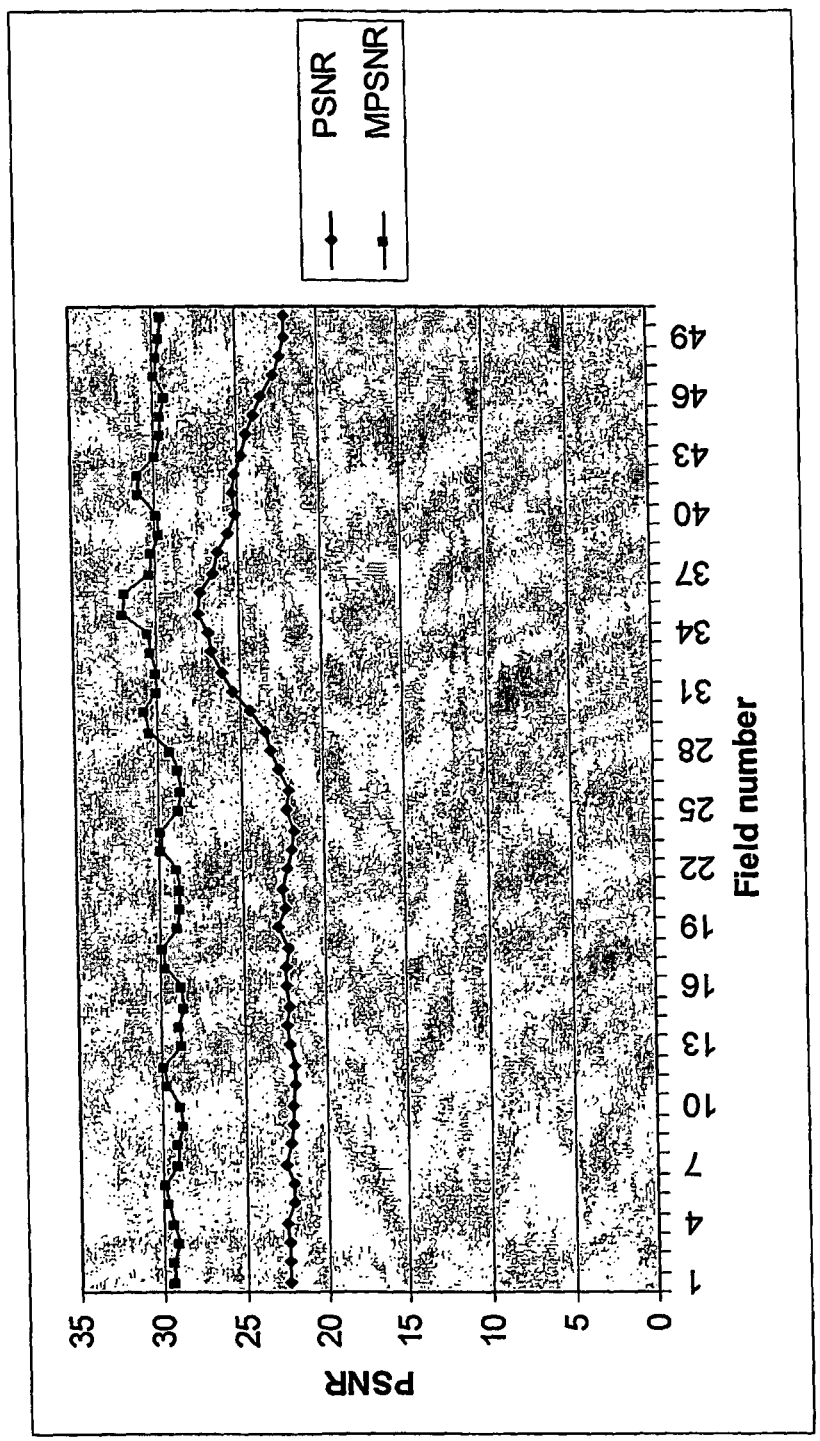
FIG. 16 is a graph illustrating calculated PSNR for 2 pixel horizontal offset (3 Mb/s MPEG2 encoding)

The MPSNR plot shows results when the matched reference sequence replaces the reference sequence as an input to the SNR module. In this case, close alignment can be seen between the PSNR and MPSNR results. FIG. 16 shows the effect of a 2 pixel horizontal offset on the degraded sequence. It can be seen that MPSNR is unchanged whereas PSNR is reduced by up to 7 dB.

Figure 17:
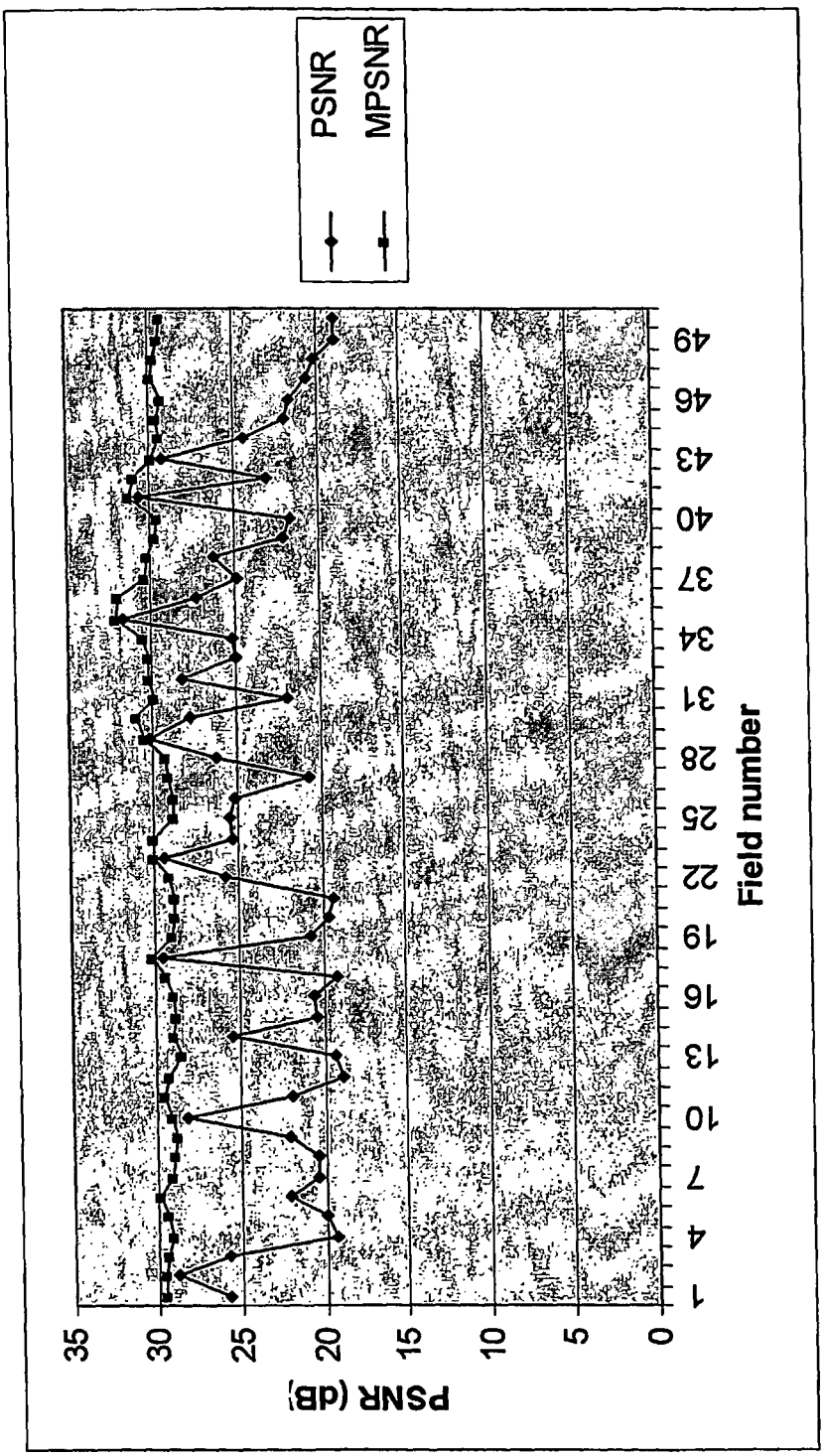
FIG. 17 is a graph illustrating calculated PSNR for horizontal jitter (3 Mb/s MPEG2 encoding)

FIG. 17 shows the effects of a random horizontal field-jitter between +/−4 pixels for the same test sequences. Again, it can be seen that the matched PSNR is unaffected by the spatial jitter, whilst the normal PSNR is greatly changed.

With regards to temporal misalignments, temporal misalignment of the reference and degraded sequences can also have a significant effect on the SNR measures. In this case the severity of the effects depends on the time-varying properties of the video sequence. As with spatial misalignment, the matching process can handle both constant and time-varying temporal offsets within the perceptual-based search limits of the algorithm.

Figure 18:
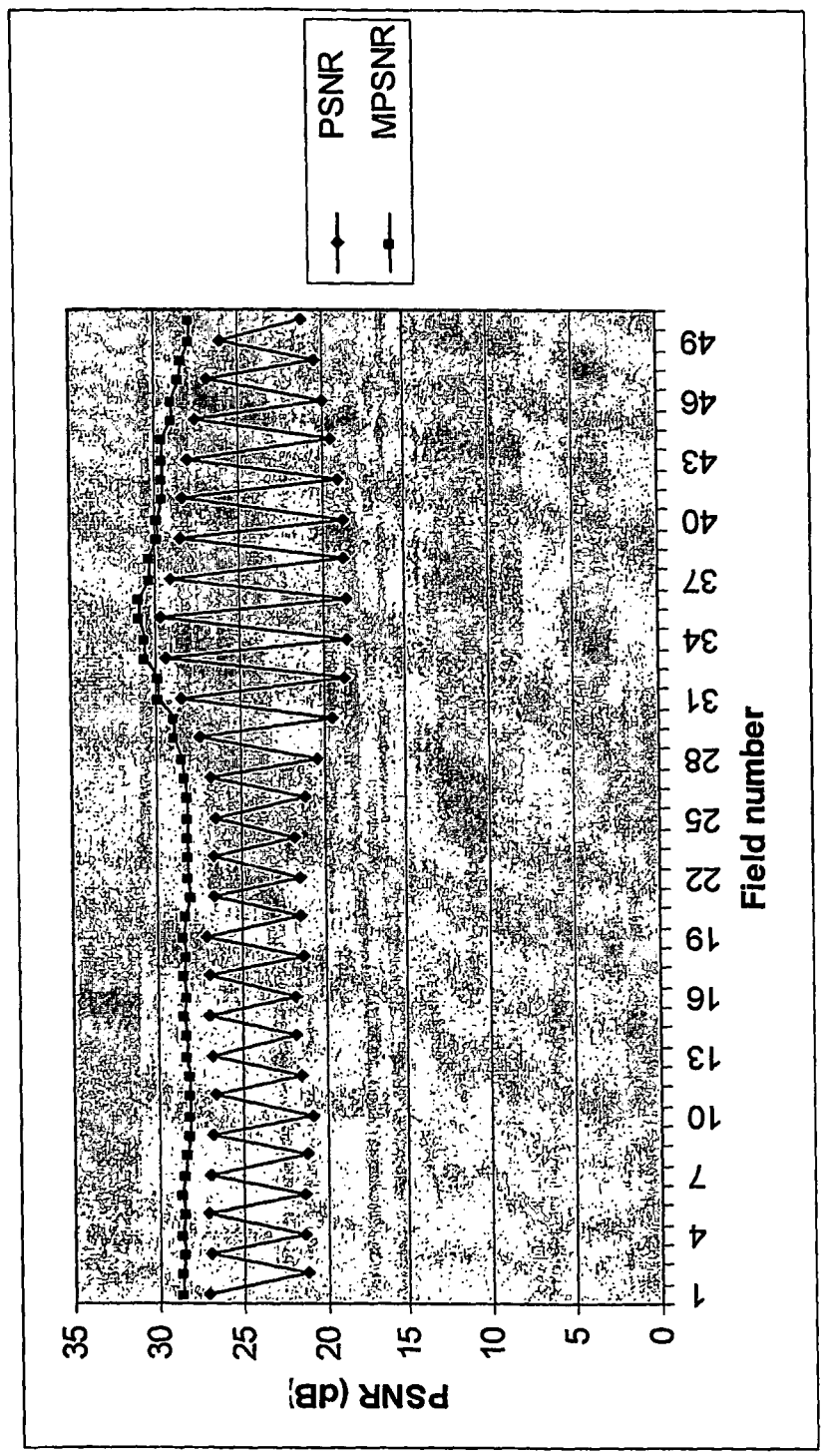
FIG. 18 is a graph illustrating calculated PSNR for temporal field-misalignment (768 kb/s H263 CIF encoding)

An interesting example of the benefits of the matching process provided by the invention is shown in FIG. 18, where a 625 broadcast sequence has been H.263 encoded at CIF resolution with the result that successive degraded fields are identical. The PSNR plot shows greatly reduced values for alternate fields due to the reduced resolution encoding, whereas the MPSNR is unaffected.

Figure 19:
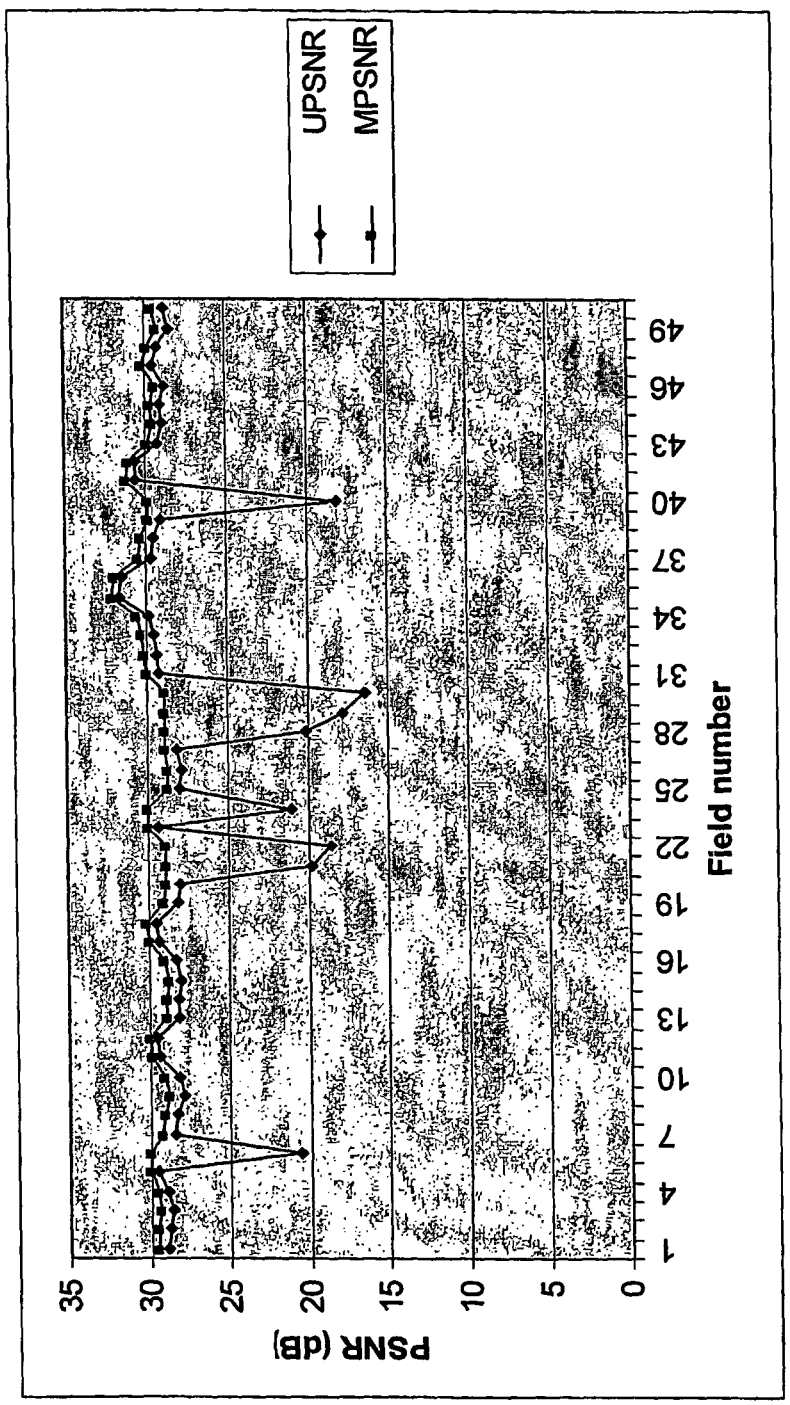
FIG. 19 is a graph illustrating calculated PSNR for field repeats (3 Mb/s MPEG2 encoding)

The matching process can also handle irregular temporal misalignments and FIG. 19 illustrates this for the random freezing of fields. In this example, each field has a 10% chance of being frozen (replacing the next field in time).

Finally, with respect to block-level distortions, the matching process of the invention is designed to handle distortions that are more complex than the field-based spatial and temporal misalignments considered so far. The matching of blocks that are small relative to the overall size of the field enables the undesirable effects of distortions such as image warping, missing lines and block freezing to be reduced.

Figure 20:
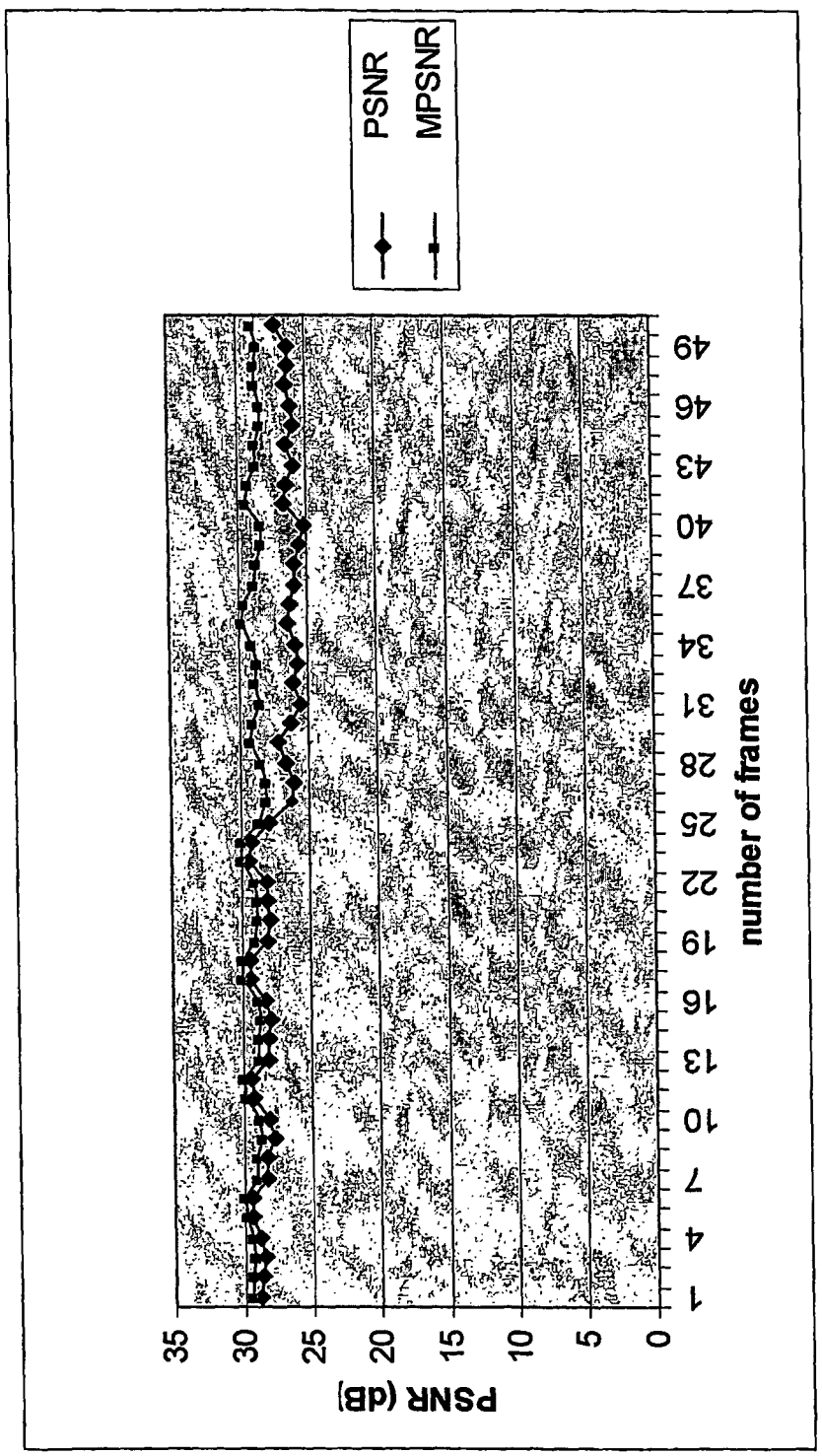
FIG. 20 is a graph illustrating calculated PSNR for temporal block-misalignment (3 Mb/s MPEG2 encoding).

FIG. 20 shows the effect that "block-freezing" has on the PSNR and MPSNR measures. The "block-freezing" simulation randomly selects only 85% of 8×8 pixel blocks within a field to be updated and in this example the process was not started until after the 25$^{th}$ field. Whilst tests showed the distortion to be imperceptible, it can be seen that the PSNR is considerably reduced. However, as the matching process is able to track the frozen blocks, the MPSNR measure is barely affected.

Unless the context clearly requires otherwise, throughout the description and the claims, the words "comprise", "comprising" and the like are to be construed in an inclusive as opposed to an exclusive or exhaustive sense; that is to say, in the sense of "including, but not limited to".

Moreover, for the avoidance of doubt, where reference has been given to a prior art document or disclosure, whose contents, whether as a whole or in part thereof, are necessary for the understanding of the operation or implementation of any of the embodiments of the present invention by the intended reader, being a man skilled in the art, then said contents should be taken as being incorporated herein by said reference thereto.

The invention claimed is:

1. A video quality assessment method, comprising:
   matching, by execution of a computer system, sub-field/frame elements of a test video field/frame with corresponding sub-field/frame elements of at least one reference video field/frame, and thereby generating for the test video field/frame a matched reference field/frame comprising the sub-field/frame elements of the at least one reference video field/frame which match to the sub-field/frame elements of the test video field/frame;
   positioning, by execution of the computer system, in the matched reference video fields/frame at least one of the matching sub-field/frame elements to compensate for misalignment between at least one of the sub-field/frame elements of the test video field/frame and the at least one matching sub-field/frame elements; and
   generating, by execution of the computer system, a video quality value in dependence on the matched sub-field/frame elements of the test and matched reference video fields/frames so as to reduce the adverse effects of sub-field/frame misalignments between the reference and test field/frames.

2. A method according to claim 1, wherein the matching further comprises, for a sub-field/frame element of the test video field/frame, searching for a matching sub-field/frame element within M1 preceding and/or M2 succeeding reference video fields/frames to a temporally corresponding reference video field/frame to the test video field/frame.

3. A method according to claim 2, wherein M1 and M2 are predefined.

4. A method according to claim 2, wherein the searching further comprises searching within a spatially bounded region of the reference video fields/frames about the corresponding position within the reference fields/frames as the test sub-field/frame element takes within the test video field/frame.

5. A method according to claim 4, wherein the spatial bound of the search region is predefined.

6. A method according to claim 1, wherein the matching further comprises, for a sub-field/frame element of the test video field/frame:
   defining a matching template comprising a portion of the test video field/frame including the sub-field/frame element; and
   using the defined matching template to search for matching sub-field/frame elements in the at least one reference video field/frame.

7. A method according to claim 1, wherein the matching further comprises calculating one or more matching statistic values and/or matching vectors; and wherein the generating generates the video quality parameter in further dependence on the calculated matching statistic values and/or matching vectors.

8. A method according to claim 7, wherein the calculating comprises:
   constructing one or more histograms relating to the searched area(s) of the reference video field(s)/frame(s); and
   calculating a matching statistic value for each histogram relating to the proportion of matched elements which contribute to the peak of the histogram.

9. A method according to claim 1, wherein the generating further comprises:
- calculating a plurality of video characteristic values respectively relating to characteristics of the test and/or reference video fields/frames in dependence on the matched sub-field/frame elements of the test and reference video fields/frames; and
- integrating at least the calculated video characteristic values together to give the video quality value.

10. A method according to claim 9, wherein the matching further comprises calculating one or more matching statistic values and/or matching vectors; and
- wherein the generating generates the video quality parameter in further dependence on the calculated matching statistic values and/or matching vectors; and wherein the integrating further includes integrating the matching statistic value (s) with the calculated video characteristic values to give the video quality value.

11. A method according to claim 9, wherein the video characteristic values are respectively any two or more of the following values: one or more spatial frequency values; one or more texture values; at least one edge value; at least one luminance signal to noise ratio value; and/or one or more chrominance signal to noise ratio values.

12. A method according to claim 11, wherein the calculation of the edge value comprises, for a test field/frame:
- counting a number of edges in each sub-field/frame element of the test field/frame;
- counting a number of edges in each sub-field/frame element of the at least one reference field/frame matched to the sub-field/frame elements of the test field/frame; and
- determining an edge value for the test field/frame in dependence on the respective counts.

13. A method according to claim 12, wherein the determining further comprises:
- calculating difference values between each pair of respective counts;
- putting each calculated difference value to the power Q;
- summing the resulting values to give a sum value; and
- putting the sum value to the power 1/Q to give the edge value.

14. A method according to claim 9, wherein the integrating further comprises weighting each value by a predetermined weighting factor; and summing the weighted values to give the video quality value.

15. A method according to claim 14, wherein the summing is further arranged to sum the weighted values with a predetermined offset value.

16. A method according to claim 14, wherein the weighting factors and the offset value are dependent on the type of the test and reference video fields/frames.

17. A method according to claim 1, wherein said positioning includes positioning a plurality of the matching sub-field/frame elements to compensate for misalignments between a plurality of the sub-field/frame elements of the test video field/frame and the plurality of the matching sub-field/frame elements.

18. A non-transitory computer readable storage medium storing at least one computer program which upon execution by a computer system performs a video quality assessment method, the method comprising:
- matching sub-field/frame elements of a test video field/frame with corresponding sub-field/frame elements of at least one reference video field/frame, and thereby generating for the test video field/frame a matched reference field/frame comprising the sub-field/frame elements of the at least one reference video field/frame which match to the sub-field/frame elements of the test video field/frame;
- shifting, by execution of the computer system, relative to the matched reference field/frame at least one of the matching sub-field/frame elements to compensate for misalignment between at least one of the sub-field/frame elements of the test video field/frame and the at least one matching sub-field/frame elements; and generating a video quality value in dependence on the matched sub-field/frame elements of the test and matched reference video fields/frames so as to reduce the adverse effects of sub-field/frame misalignments between the reference and test field/frames.

19. A non-transitory computer readable storage medium according to claim 18, wherein the matching further comprises, for a sub-field/frame element of the test video field/frame, searching for a matching sub-field/frame element within M1 preceding and/or M2 succeeding reference video fields/frames to a temporally corresponding reference video field/frame to the test video field/frame.

20. A non-transitory computer readable storage medium according to claim 19, wherein M1 and M2 are predefined.

21. A non-transitory computer readable storage medium according to claim 19, wherein the searching further comprises searching within a spatially bounded region of the reference video fields/frames about the corresponding position within the reference fields/frames as the test sub-field/frame element takes within the test video field/frame.

22. A non-transitory computer readable storage medium according to claim 21, wherein the spatial bound of the search region is predefined.

23. A non-transitory computer readable storage medium according to claim 18, wherein the matching further comprises, for a sub-field/frame element of the test video field/frame:
- defining a matching template comprising a portion of the test video field/frame including the sub-field/frame element; and
- using the defined matching template to search for matching sub-field/frame elements in the at least one reference video field/frame.

24. A non-transitory computer readable storage medium according to claim 18, wherein the matching further comprises calculating one or more matching statistic values and/or matching vectors; and wherein the generating generates the video quality parameter in further dependence on the calculated matching statistic values and/or matching vectors.

25. A non-transitory computer readable storage medium according to claim 24, wherein the calculating comprises:
- constructing one or more histograms relating to the searched area(s) of the reference video field(s)/frame(s); and
- calculating a matching statistic value for each histogram relating to the proportion of matched elements which contribute to the peak of the histogram.

26. A non-transitory computer readable storage medium according to claim 18, wherein the generating further comprises:
- calculating a plurality of video characteristic values respectively relating to characteristics of the test and/or reference video fields/frames in dependence on the matched sub-field/frame elements of the test and reference video fields/frames; and
- integrating at least the calculated video characteristic values together to give the video quality value.

27. A non-transitory computer readable storage medium according to claim 26, wherein the matching further comprises calculating one or more matching statistic values and/or matching vectors; and wherein the generating generates the video quality parameter in further dependence on the calculated matching statistic values and/or matching vectors; and wherein the integrating further includes integrating the matching statistic value(s) with the calculated video characteristic values to give the video quality value.

28. A non-transitory computer readable storage medium according to claim 26, wherein the video characteristic values are respectively any two or more of the following values: one or more spatial frequency values; one or more texture values; at least one edge value ; at least one luminance signal to noise ratio value; and/or one or more chrominance signal to noise ratio values.

29. A non-transitory computer readable storage medium according to claim 28, wherein the calculation of the edge value comprises, for a test field/frame:
  counting a number of edges in each sub-field/frame element of the test field/frame;
  counting a number of edges in each sub-field/frame element of the at least one reference field/frame matched to the sub-field/frame elements of the test field/frame; and
  determining an edge value for the test field/frame in dependence on the respective counts.

30. A non-transitory computer readable storage medium according to claim 29, wherein the determining further comprises:
  calculating difference values between each pair of respective counts;
  putting each calculated difference value to the power Q;
  summing the resulting values to give a sum value; and
  putting the sum value to the power 1/Q to give the edge value.

31. A non-transitory computer readable storage medium according to claim 26, wherein the integrating further comprises weighting each value by a predetermined weighting factor; and summing the weighted values to give the video quality value.

32. A non-transitory computer readable storage medium according to claim 31, wherein the summing is further arranged to sum the weighted values with a predetermined offset value.

33. A non-transitory computer readable storage medium according to claim 31, wherein the weighting factors and the offset value are dependent on the type of the test and reference video fields/frames.

34. A non-transitory computer readable storage medium according to claim 18, wherein said positioning includes positioning a plurality of the matching sub-field/frame elements to compensate for misalignments between a plurality of the sub-field/frame elements of the test video field/frame and the plurality of the matching sub-field/frame elements.

35. A system for video quality assessment, comprising:
  matching means for matching sub-field/frame elements of a test video field/frame with corresponding sub-field/frame elements of at least one reference video field/frame, and thereby generating for the test video field/frame a matched reference field/frame comprising the sub-field/frame elements of the at least one reference video field/frame which match to the sub-field/frame elements of the test video field/frame;
  shifting means for shifting relative to the matched reference field/frame at least one of the matching sub-field/frame elements to compensate for misalignment between at least one of the sub-field/frame elements of the test video field/frame and the at least one matching sub-field/frame elements of the at least one reference video field/frame; and
  video processing means arranged in use to generate a video quality value in dependence on the matched sub-field/frame elements of the test and matched reference video fields/frames so as to reduce the adverse effects of sub-field/frame misalignments between the reference and test field/frames.

36. A system according to claim 35, wherein the matching means further comprises, temporal searching means arranged in use to search for a matching sub-field/frame element within M1 preceding and/or M2 succeeding reference video fields/frames to a temporally corresponding reference video field/frame to the test video field/frame.

37. A system according to claim 36, wherein M1 and M2 are predefined.

38. A system according to claim 36, and further comprising spatial searching means arranged in use to search within a spatially bounded region of the reference video fields/frames about the corresponding position within the reference fields/frames as the test sub-field/frame element takes within the test video field/frame.

39. A system according to claim 38, wherein the spatial bound of the search region is predefined.

40. A system according to claim 35, wherein the matching means further comprises:
  means for defining a matching template comprising a portion of the test video field/frame including the sub-field/frame element; and
  means for using the defined matching template to search for matching sub-field/frame elements in the at least one reference video field/frame.

41. A system according to claim 35, wherein the matching means further comprises calculating means arranged in use to calculate one or more matching statistic values and/or matching vectors; and wherein the video processing means is further arranged in use to generate the video quality parameter in further dependence on the calculated matching statistic values and/or matching vectors.

42. A system according to claim 41, wherein the calculating means further comprises:
  histogram constructing means arranged in use to construct one or more histograms relating to the searched area(s) of the reference video field(s)/frame(s); and
  matching statistic calculating means for calculating a matching statistic value for each histogram relating to the proportion of matched elements which contribute to the peak of the histogram.

43. A system according to claim 35, wherein the video processing means further comprises:
  a plurality of analysis means respectively arranged in use to calculate a plurality of video characteristic values respectively relating to characteristics of the test and/or reference video fields/frames in dependence on the matched sub-field/frame elements of the test and reference video fields/frames; and
  an integration means for integrating at least the calculated video characteristic values together to give the video quality value.

44. A system according to claim 43, wherein the matching means further comprises calculating means arranged in use to calculate one or more matching statistic values and/or matching vectors; and wherein the video processing means is further arranged in use to generate the video quality parameter in further dependence on the calculated matching statistic values and/or matching vectors; and wherein the integration means is further arranged to integrate the matching statistic value(s) with the calculated video characteristic values to give the video quality value.

45. A system according to claim 43, wherein the video characteristic values are respectively any two or more of the following values: one or more spatial frequency values; one or more texture values; at least one edge value; at least one luminance signal to noise ratio value; and/or one or more chrominance signal to noise ratio values.

46. A system according to claim 45, and further comprising edge calculation means comprising:
 means for counting a number of edges in each sub-field/frame element of the test field/frame;
 means for counting a number of edges in each sub-field/frame element of the at least one reference field/frame matched to the sub-field/frame elements of the test field/frame; and
 means for determining an edge value for the test field/frame in dependence on the respective counts.

47. A system according to claim 46, wherein the means for determining further comprises an arithmetic calculator means arranged in use to:
 calculate difference values between each pair of respective counts;
 put each calculated difference value to the power Q;
 sum the resulting values to give a sum value; and
 put the sum value to the power 1/Q to give the edge value.

48. A system according to claim 43, wherein the integrating means further comprises weighting means for weighting each value by a predetermined weighting factor; and summing means for summing the weighted values to give the video quality value.

49. A system according to claim 48, wherein the summing means is further arranged to sum the weighted values with a predetermined offset value.

50. A system according to claim 48, wherein the weighting factors and the offset value are dependent on the type of the test and reference video fields/frames.

51. A system according to claim 35, wherein the shifting means shifts, relative to the matched reference field/frame, a plurality of the matching sub-field/frame elements to compensate for misalignments between a plurality of the sub-field/frame elements of the test video field/frame and the plurality of matching sub-field/frame elements of the at least one reference video field/frame.

\* \* \* \* \*

UNITED STATES PATENT AND TRADEMARK OFFICE
CERTIFICATE OF CORRECTION

PATENT NO.        : 8,508,597 B2                                              Page 1 of 1
APPLICATION NO.   : 10/560448
DATED             : August 13, 2013
INVENTOR(S)       : Bourret et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1724 days.

Signed and Sealed this

Fifteenth Day of September, 2015

Michelle K. Lee
*Director of the United States Patent and Trademark Office*